(12) United States Patent
Takenaka et al.

(10) Patent No.: US 11,975,730 B2
(45) Date of Patent: May 7, 2024

(54) VEHICLE CONTROL APPARATUS AND VEHICLE CONTROL METHOD

(71) Applicant: TOYOTA JIDOSHA KABUSHIKI KAISHA, Toyota (JP)

(72) Inventors: Atsushi Takenaka, Miyoshi (JP); Takashi Unigame, Nagoya (JP); Masaki Ikai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 446 days.

(21) Appl. No.: 17/476,575

(22) Filed: Sep. 16, 2021

(65) Prior Publication Data

US 2022/0161812 A1 May 26, 2022

(30) Foreign Application Priority Data

Nov. 24, 2020 (JP) ................................ 2020-194258

(51) Int. Cl.
*B60W 50/10* (2012.01)

(52) U.S. Cl.
CPC ....... *B60W 50/10* (2013.01); *B60W 2540/103* (2013.01); *B60W 2552/15* (2020.02); *B60W 2720/106* (2013.01); *B60W 2720/125* (2013.01)

(58) Field of Classification Search
None
See application file for complete search history.

(56) References Cited

U.S. PATENT DOCUMENTS

| 7,909,735 B1 * | 3/2011 | Kuskie | B60W 50/10 |
| | | | 477/187 |
| 9,371,001 B2 * | 6/2016 | Fraser | F02D 41/22 |
| 11,429,132 B1 * | 8/2022 | Yasuda | B60K 26/02 |
| 11,498,550 B2 * | 11/2022 | Watanabe | B60W 40/068 |
| 11,858,497 B2 * | 1/2024 | Balachandran | B60W 10/18 |
| 2007/0142169 A1 * | 6/2007 | Marcil | B60Q 5/006 |
| | | | 477/107 |

(Continued)

FOREIGN PATENT DOCUMENTS

| JP | 2015063229 A | 4/2015 |
| JP | 2018131069 A | 8/2018 |
| JP | 2019043526 A | 3/2019 |

*Primary Examiner* — Jonathan M Dager
(74) *Attorney, Agent, or Firm* — Dickinson Wright, PLLC

(57) ABSTRACT

A vehicle control apparatus executes a driving force limiting control when a mistaken operation condition is satisfied. The vehicle control apparatus determines that the mistaken operation condition is satisfied when a third condition is satisfied at a point in time when a second condition becomes satisfied, determines that the mistaken operation condition is not satisfied when the third condition is not satisfied at a point in time when the second condition becomes satisfied, the third condition becomes satisfied within a first time threshold since a first condition becomes satisfied, and a pressing condition is satisfied before the third condition becomes satisfied, and determines that the pressing condition is satisfied when an operation amount of an acceleration operator is greater than or equal to a positive second operation amount threshold, and an operation speed of the acceleration operator is greater than or equal to a positive second operation speed threshold.

5 Claims, 14 Drawing Sheets

(56) References Cited

U.S. PATENT DOCUMENTS

| | | | | |
|---|---|---|---|---|
| 2011/0010034 A1* | 1/2011 | Zagorski | ............... | B60W 50/12 701/31.4 |
| 2012/0179304 A1* | 7/2012 | Tokumochi | ........... | B60W 50/10 701/1 |
| 2012/0209488 A1* | 8/2012 | Nagaya | ................ | B60W 10/06 701/70 |
| 2012/0253624 A1* | 10/2012 | Maruyama | .............. | F02D 11/02 701/70 |
| 2012/0322616 A1* | 12/2012 | Fukui | .................... | B60W 50/10 477/94 |
| 2013/0041564 A1* | 2/2013 | Doi | .................... | B60W 50/087 701/70 |
| 2015/0204255 A1* | 7/2015 | Seguchi | ................ | F02D 29/02 701/113 |
| 2015/0321555 A1* | 11/2015 | Fukata | ................ | B60W 50/12 701/70 |
| 2017/0174211 A1* | 6/2017 | Mizoguchi | ........... | B60W 10/06 |
| 2018/0037235 A1* | 2/2018 | Otake | .................. | B60W 10/18 |
| 2018/0373244 A1* | 12/2018 | Augst | .................. | B60W 30/10 |
| 2019/0001994 A1* | 1/2019 | Isaji | .................. | B60W 60/0055 |
| 2019/0039624 A1* | 2/2019 | Ike | ........................ | B60W 30/09 |
| 2019/0256095 A1* | 8/2019 | Takagi | ................ | B60W 50/14 |
| 2019/0315347 A1* | 10/2019 | Ike | ........................ | B60W 30/09 |
| 2019/0344802 A1* | 11/2019 | Yamashita | .......... | B60W 50/087 |
| 2020/0262446 A1* | 8/2020 | Mayoshi | ............... | B60W 50/10 |
| 2020/0317197 A1* | 10/2020 | Kubo | .................... | B60W 50/10 |
| 2020/0331474 A1* | 10/2020 | Oda | ...................... | B60W 10/04 |
| 2020/0369286 A1* | 11/2020 | Zhang | ................. | B60W 40/105 |
| 2021/0039665 A1* | 2/2021 | Kaminade | ............. | B60W 50/10 |
| 2021/0046935 A1* | 2/2021 | Mizoguchi | .......... | B60W 30/045 |
| 2021/0086772 A1* | 3/2021 | Matsuura | ........ | B60W 30/18027 |
| 2021/0094529 A1* | 4/2021 | Mizoguchi | ........ | B60W 60/0053 |
| 2021/0171022 A1* | 6/2021 | Tsuchiya | ............... | B60W 10/18 |
| 2021/0197844 A1* | 7/2021 | Kaminade | ........... | B60W 50/087 |
| 2021/0213942 A1* | 7/2021 | Kayano | ................ | B60W 30/09 |
| 2021/0213967 A1* | 7/2021 | Tochigi | ................ | B60W 50/087 |
| 2021/0213974 A1* | 7/2021 | Shimbo | ................. | B60W 10/08 |
| 2021/0221365 A1* | 7/2021 | Mase | .................... | B60W 10/04 |
| 2021/0261144 A1* | 8/2021 | Kwon | ................ | G01C 21/3679 |
| 2021/0309240 A1* | 10/2021 | Kim | ...................... | B60W 50/14 |
| 2021/0347376 A1* | 11/2021 | Klesing | ................ | B60W 50/14 |
| 2021/0362715 A1* | 11/2021 | Kim | .................... | B60W 30/188 |
| 2021/0387633 A1* | 12/2021 | Shimomura | ........ | B60W 50/085 |
| 2022/0032959 A1* | 2/2022 | Homma | ................ | B60W 10/20 |
| 2022/0176981 A1* | 6/2022 | Kuehner | ............... | B60W 10/06 |
| 2022/0176982 A1* | 6/2022 | Kakeshita | ............. | B60W 50/12 |
| 2022/0227382 A1* | 7/2022 | Kuehner | ........... | B60W 50/0097 |
| 2022/0297539 A1* | 9/2022 | Sasaki | .................... | B60K 26/02 |
| 2023/0035434 A1* | 2/2023 | Ishii | ...................... | B60W 50/12 |
| 2023/0141314 A1* | 5/2023 | Dobashi | .............. | B60W 30/143 701/23 |
| 2023/0202475 A1* | 6/2023 | Tsuchiya | ............... | B60W 10/18 701/93 |
| 2023/0322211 A1* | 10/2023 | Yoshikawa | ........... | B60W 30/08 701/99 |
| 2023/0373472 A1* | 11/2023 | Watanabe | ............. | B60W 30/09 |
| 2024/0001950 A1* | 1/2024 | Ravuri | .................. | B60W 50/16 |

\* cited by examiner

VEHICLE CONTROL APPARATUS AND VEHICLE CONTROL METHOD

BACKGROUND

Field

The invention relates to a vehicle control apparatus and a vehicle control method which controls a moving state of a vehicle when the vehicle control apparatus determines that an acceleration operator is mistakenly operated.

Description of the Related Art

A known vehicle control apparatus (hereinafter, this apparatus will be referred to as "conventional apparatus") determines that an acceleration operator (for example, an accelerator pedal) of a vehicle is mistakenly operated instead of a deceleration operator (for example, a brake pedal) of the vehicle when an operation amount of the acceleration operator rapidly increases. Hereinafter, such an operation applied to the acceleration operator will be referred to as "mistaken operation to the acceleration operator (for example, the accelerator pedal). The conventional apparatus controls a moving state of the vehicle to prevent an actual acceleration of the vehicle from exceeding an upper limit acceleration when the conventional apparatus determines that the mistaken operation to the acceleration operator is carried out (see JP 2018-131069 A). For convenience, such a control will be also referred to as "driving force limiting control".

When a driver even intentionally operates the acceleration operator, the operation amount of the acceleration operator may rapidly increase. Even in such a situation arises, the conventional apparatus may determine that the mistaken operation to the acceleration operator is carried out and execute the driving force limiting control. Thus, there is a problem that the vehicle is not accelerated even when the mistaken operation to the acceleration operator is not carried out.

SUMMARY

An object of the invention is to provide a vehicle control apparatus and a vehicle control method which can distinguish the mistaken operation to the acceleration operator from an intentional operation to the acceleration operator with higher accuracy, compared with the conventional apparatus.

A vehicle control apparatus according to the invention comprises an acceleration operator, a deceleration operator, at least one direction indicator, and a control unit. The acceleration operator is operated by a driver of a vehicle to accelerate the vehicle. The deceleration operator is operated by the driver to decelerate the vehicle. The control unit executes a driving force limiting control of controlling a driving force applied to the vehicle which changes, depending on an operation amount of the acceleration operator, to the smaller driving force when a predetermined mistaken operation condition is satisfied, compared with when the predetermined mistaken operation condition is not satisfied.

In the vehicle control apparatus according to the invention, the predetermined mistaken operation condition includes a first condition, a second condition, and a third condition. The first condition includes an operation speed condition that an operation speed which corresponds to a change amount of the operation amount per unit time, is greater than or equal to a predetermined positive first operation speed threshold. The second condition is a condition which is determined after the first condition becomes satisfied and that the operation amount becomes greater than or equal to a predetermined positive first operation amount threshold within a predetermined first time threshold since the first condition becomes satisfied. The third condition includes at least one of (i) a condition that an elapsed time which elapses since the driver stops operating the deceleration operator, is longer than or equal to a predetermined second time threshold, and (ii) a condition that an elapsed time which elapses since the at least one direction indicator is changed from an ON state to an OFF state, is longer than or equal to a predetermined third time threshold.

Further, in the vehicle control apparatus according to the invention, the control unit determines that the predetermined mistaken operation condition is satisfied when the third condition is satisfied at a point in time when the second condition becomes satisfied. Further, the control unit determines that the predetermined mistaken operation condition is not satisfied when (i) the third condition is not satisfied at a point in time when the second condition becomes satisfied, (ii) the third condition becomes satisfied within the predetermined first time threshold since the first condition becomes satisfied, and (iii) a predetermined pressing condition is satisfied before the third condition becomes satisfied. Furthermore, the control unit determines that the predetermined pressing condition is satisfied when (i) the operation amount is greater than or equal to a predetermined positive second operation amount threshold, and (ii) the operation speed is greater than or equal to a predetermined positive second operation speed threshold.

The vehicle control apparatus according to the invention can distinguish the mistaken operation to the acceleration operator from the intentional operation to the acceleration operator by using the first, second, and third conditions with higher accuracy, compared with the conventional apparatus.

Further, when the driver intentionally and strongly operates the acceleration operator just after stopping operating the deceleration operator, a situation that (i) the third condition is not satisfied at a point in time when the second condition becomes satisfied, and (ii) the third condition becomes satisfied with the predetermined first time threshold since the first condition becomes satisfied, may arise. When (i) such a situation arises, and (ii) the predetermined pressing condition is satisfied before the third condition becomes satisfied, the vehicle control apparatus according to the invention determines that the predetermined mistaken operation condition is not satisfied. Thus, the driving force limiting control can be prevented from being executed when a situation that the driver intentionally and strongly operates the acceleration operator, arises.

As described above, when the driver intentionally and strongly operates the acceleration operator just after stopping operating the deceleration operator, the driver keeps strongly operating the acceleration operator. In this case, the operation speed decreases, but the operation amount is kept at a relatively great operation amount. When these operations are carried out, the vehicle control apparatus according to the invention can determine that the predetermined pressing condition becomes satisfied. Thus, the vehicle control apparatus according to the invention can determine whether a probability that the driver intentionally operates the acceleration operator, is high by using the predetermined pressing condition.

According to an aspect of the invention, the predetermined positive second operation amount threshold may be set to a value greater than or equal to the predeterpositive first operation amount threshold. Further, the predetermined positive second operation speed threshold may be set to a value smaller than or equal to the predetermined positive first operation speed threshold.

The vehicle control apparatus according to this aspect of the invention can determine whether (i) the operation speed decreases, and (ii) the operation amount is kept at the great operation amount, based on (i) a relationship between the predetermined positive first and second operation amount thresholds and (ii) a relationship between the predetermined positive first and second operation speed thresholds.

According to one or more embodiments, the predetermined positive second operation amount threshold may be a value equal to the predetermined positive first operation amount threshold.

According to another aspect of the invention, the first condition may include an operation amount condition that the operation amount at a point in time when the operation speed condition becomes satisfied, is greater than or equal to a positive third amount threshold smaller than the predetermined positive first operation amount threshold, in addition to the operation speed condition.

The vehicle control apparatus according to this aspect of the invention can distinguish the mistaken operation to the acceleration operator from the intentional operation to the acceleration operator with high accuracy.

According to further another aspect of the invention, the predetermined mistaken operation condition may include at least one of (i) a fourth condition that a moving speed of the vehicle is greater than or equal to a predetermined speed threshold and (ii) a fifth condition that a gradient of a road on which the vehicle moves, is smaller than or equal to a predetermined gradient threshold.

The vehicle control apparatus according to this aspect of the invention can distinguish the mistaken operation to the acceleration operator from the intentional operation to the acceleration operator in consideration of the moving speed and/or the gradient.

A method according to the invention is applied to a vehicle comprising (i) an acceleration operator which is operated by a driver of a vehicle to accelerate the vehicle, (ii) a deceleration operator which is operated by the driver to decelerate the vehicle, and (iii) at least one direction indicator.

The method according to the invention comprises a determining step of determining whether a predetermined mistaken operation condition is satisfied, and a controlling step of executing a driving force limiting control of controlling a driving force applied to the vehicle which changes, depending on an operation amount of the acceleration operator, to the smaller driving force when determining that the predetermined mistaken operation condition is satisfied at the determining step, compared with when the predetermined mistaken operation condition is not satisfied.

In the method according to the invention, the predetermined mistaken operation condition includes a first condition, a second condition, and a third condition. Further, in the method according to the invention, the first condition includes an operation speed condition that an operation speed which corresponds to a change amount of the operation amount per unit time, is greater than or equal to a predetermined positive first operation speed threshold. Furthermore, the second condition is a condition which is determined after the first condition becomes satisfied and that the operation amount becomes greater than or equal to a predetermined positive first operation amount threshold within a predetermined first time threshold since the first condition becomes satisfied. Furthermore, The third condition includes at least one of (i) a condition that an elapsed time which elapses since the driver stops operating the deceleration operator, is longer than or equal to a predetermined second time threshold, and (ii) a condition that an elapsed time which elapses since the at least one direction indicator is changed from an ON state to an OFF state, is longer than or equal to a predetermined third time threshold.

Further, in the method according to the invention, the determining step includes a step of determining that the predetermined mistaken operation condition is satisfied when the third condition is satisfied at a point in time when the second condition becomes satisfied. Further, the determining step includes a step of determining that the predetermined mistaken operation condition is not satisfied when (i) the third condition is not satisfied at a point in time when the second condition becomes satisfied, (ii) the third condition becomes satisfied within the predetermined first time threshold since the first condition becomes satisfied, and (iii) a predetermined pressing condition is satisfied before the third condition becomes satisfied. Furthermore, the determining step includes a step of determining that the predetermined pressing condition is satisfied when (i) the operation amount is greater than or equal to a predetermined positive second operation amount threshold, and (ii) the operation speed is greater than or equal to a predetermined positive second operation speed threshold.

According to one or more embodiments, the control unit may be realized by a micro-processor which is programmed to execute one or more functions described in this description. Further, according to one or more embodiments, the control unit may be totally or partially realized by hardware configured by integrated circuits such as ASIC dedicated to one or more applications.

Elements of the invention are not limited to elements of embodiments and modified examples of the invention described along with the drawings. The other objects, features and accompanied advantages of the invention can be easily understood from the embodiments and the modified examples of the invention.

DESCRIPTION OF THE EMBODIMENTS

First Embodiment

Figure 1:
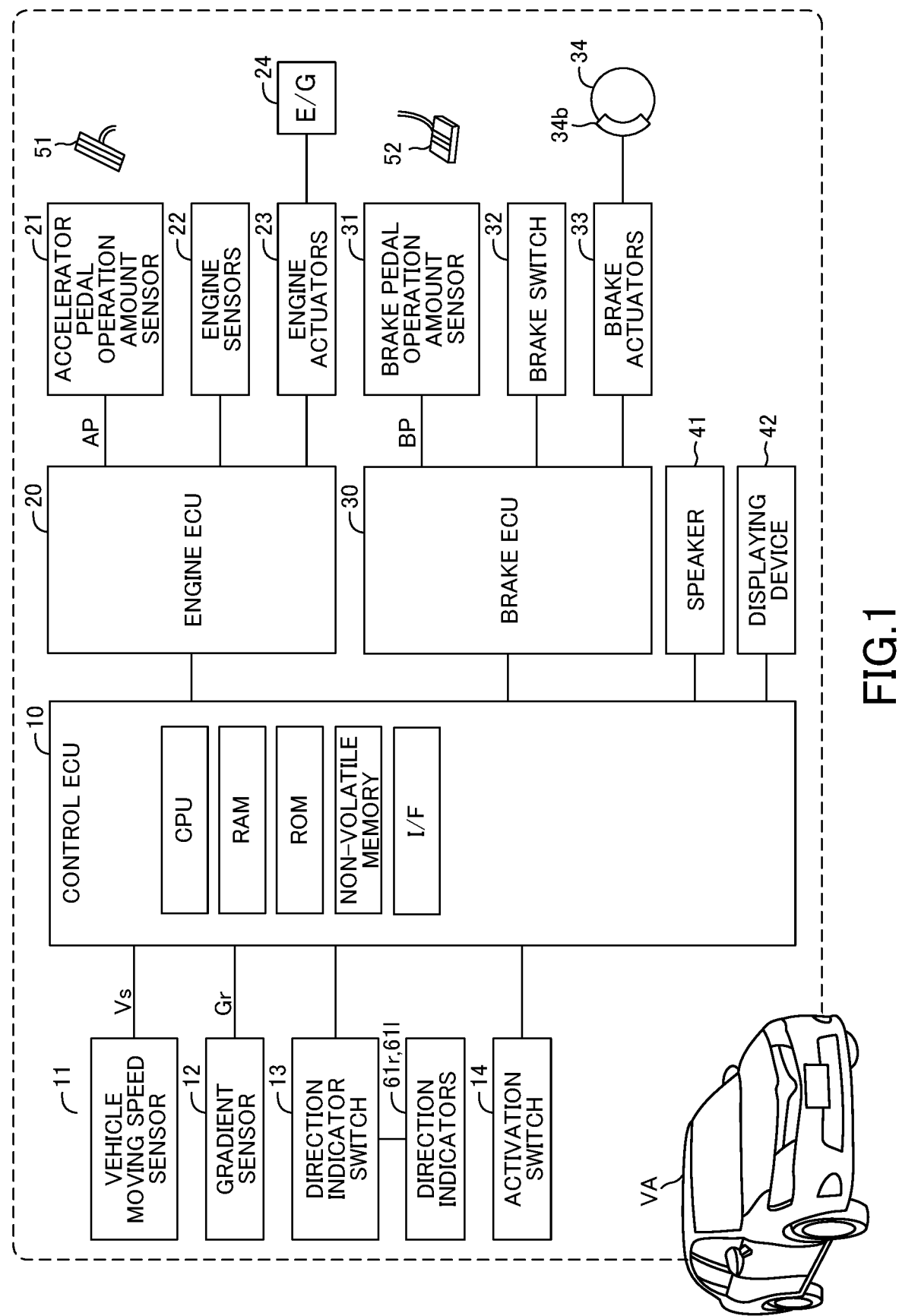
FIG. 1 is a general configuration view which shows a vehicle control apparatus (or a first apparatus) according to a first embodiment of the invention.

As shown in FIG. 1, a vehicle control apparatus according to a first embodiment of the invention is applied to a vehicle VA. Hereinafter, the vehicle control apparatus according to the first embodiment will be referred to as "first apparatus".

<Configuration>

The first apparatus includes a control ECU 10, an engine ECU 20, and a brake ECU 30. The ECUs 10, 20, and 30 are electrically connected to each other via a CAN (Controller Area Network) not shown to as to send and receive information to and from each other. It should be noted that some or all of the ECUs 10, 20, and 30 may be integrated into one ECU.

ECU stands for electronic control unit. The ECU is an electronic control circuit which includes a micro-computer as a main component. In this description, the micro-computer includes a CPU, a RAM, a ROM, a non-volatile memory, and an interface (I/F). The CPU is configured or programmed to realize various functions described later by executing instructions or programs or routines memorized in the ROM.

The control ECU 10 is electrically connected to sensors and switches described below and is configured to receive detection signals or output signals sent from the sensors and the switches.

A vehicle moving speed sensor 11 detects a moving speed of the vehicle VA and is configured to output signals which represent the moving speed of the vehicle VA. Hereinafter, the moving speed of the vehicle VA will be also referred to as "vehicle moving speed Vs".

A gradient sensor 12 includes, for example, a two-axes acceleration sensor which detects an acceleration of the vehicle in a longitudinal direction of the vehicle and an acceleration of the vehicle in a vertical direction of the vehicle. The gradient sensor 12 is configured to output signals which represent a gradient Gr of a road on which the vehicle moves in the longitudinal direction of the vehicle.

For example, the gradient sensor 12 detects the gradient Gr, based on a ratio of the acceleration of the vehicle in the longitudinal direction of the vehicle and the acceleration of the vehicle in the vertical direction of the vehicle. The gradient Gr is zero when the vehicle VA moves on a horizontal or level road. The gradient Gr takes a positive value (Gr>0) when the vehicle VA moves on an upward slope. On the other hand, the gradient Gr takes a negative value (Gr<0) when the vehicle VA moves on a downward slope.

A direction indicator switch 13 such as a blinker switch or a winker switch is a switch operated to switch states of right direction indicators 61*r* such as right blinkers or right winkers and states of left direction indicators 61*l* such as left blinkers or right winkers between an ON state and an OFF state. The driver operates a direction indicator lever (not shown) such as a blinker lever or a winker lever to activate or blink the right and left direction indicators 61*r* and 61*l*. The direction indicator lever is configured to be operated at a first position and a second position. The first position is a position at which the direction indicator lever is rotated clockwise from an initial position by a predetermined angle. The second position is a position at which the direction indicator lever is rotated counterclockwise from the initial position by the predetermined angle.

When the direction indicator lever is at the first position, the direction indicator switch 13 sets the states of the right direction indicators 61*r* at the ON state. In other words, the direction indicator switch 13 blinks the right direction indicators 61*r*. In this case, the direction indicator switch 13 outputs a signal which represents that the right direction indicators 61*r* are in the ON state, to the control ECU 10. When the direction indicator lever is at the second position, the direction indicator switch 13 sets the states of the left direction indicators 61*l* at the ON state. In other words, the direction indicator switch 13 blinks the left direction indicators 61*l*. In this case, the direction indicator switch 13 outputs a signal which represents that the left direction indicators 61*l* are in the ON state, to the control ECU 10. It should be noted that when the right and left direction indicators 61*r* and 61*l* are in the OFF state, the direction indicator switch 13 outputs a signal which represents that the right and left direction indicators 61*r* and 61*l* are in the OFF state, to the control ECU 10.

An activation switch 14 is a switch which the driver operates to request to permit and forbid executing a driving force limiting control described later. Each time the activation switch 14 is pressed, a state of the activation switch 14 is switched between an ON state and an OFF state. When the state of the activation switch 14 is at the ON state, the driving force limiting control is permitted to be executed. On the other hand, when the state of the activation switch 14 is at the OFF state, the driving force limiting control is forbidden to be executed.

The engine ECU 20 is electrically connected to an accelerator pedal operation amount sensor 21 and engine sensors 22. The accelerator pedal operation amount sensor 21 detects an operation amount of an accelerator pedal 51, i.e., an accelerator opening degree [%] of the accelerator pedal 51 and outputs signals which represent the operation amount of the accelerator pedal 51 to the engine ECU 20. The operation amount of the accelerator pedal 51 will be referred to as "accelerator pedal amount AP". The accelerator pedal 51 is an acceleration operator which the driver operates to accelerate the vehicle VA. When the driver does not operate the accelerator pedal 51, i.e., the driver does not press the accelerator pedal 51, the accelerator pedal operation amount AP is zero. As an amount of pressing the accelerator pedal 51 by the driver increases, the accelerator pedal operation amount AP increases. It should be noted that the engine ECU 20 sends the detection signals received from the accelerator pedal operation amount sensor 21, to the control ECU 10.

The engine sensors 22 are sensors which detect driving state amounts of an internal combustion engine 24. The engine sensors 22 include a throttle valve opening degree sensor, an engine speed sensor, and an intake air amount sensor.

The engine ECU 20 is electrically connected to engine actuators 23. The engine actuators 23 include a throttle valve actuator which changes an opening degree of a throttle valve of the spark-ignition gasoline-injection type of the internal combustion engine 24. The engine ECU 20 can change torque generated by the internal combustion engine 24 by activating the engine actuators 23. The torque generated by the internal combustion engine 24 is transmitted to driven wheels of the vehicle VA via a transmission (not shown). Thus, the engine ECU 20 can control driving force applied to the vehicle to change an accelerated state or an acceleration of the vehicle by controlling the engine actuators 23.

It should be noted that when the vehicle is a hybrid electric vehicle (HEV), the engine ECU 20 can control the driving force generated by one or both of the internal combustion engine and at least one electric motor as vehicle driving sources and applied to the vehicle. Also, when the vehicle is a battery electric vehicle (BEV), the engine ECU 20 can control the driving force generated by at least one electric motor as the vehicle driving source and applied to the vehicle.

The brake ECU 30 is electrically connected to a brake pedal operation amount sensor 31 and a brake switch 32. The brake pedal operation amount sensor 31 detects an operation amount of a brake pedal 52 and outputs signals which represent the operation amount of the brake pedal 52. The operation amount of the brake pedal 52 will be referred to as "brake pedal operation amount BP". The brake pedal 52 is a deceleration operator which the driver operates to decelerate the vehicle VA. When the driver does not operate the brake pedal 52, i.e., the driver does not press the brake pedal 52, the brake pedal operation amount BP is zero. As an amount of pressing the brake pedal 52 by the driver increases, the brake pedal operation amount BP increases. It should be noted that the brake ECU 30 sends the detection signals received from the brake pedal operation amount sensor 31, to the control ECU 10.

The brake switch 32 outputs ON signals to the brake ECU 30 when the brake pedal 52 is operated. On the other hand, when the brake switch 32 outputs OFF signals to the brake ECU 30 when the brake pedal 52 is not operated. It should be noted that the brake ECU 30 sends the signals received from the brake switch 32, to the control ECU 10.

In addition, the brake ECU 30 is electrically connected to brake actuators 33. Braking force or braking torque applied to wheels of the vehicle VA are controlled by the brake actuators 33. The brake actuators 33 adjust hydraulic pressure applied to wheel cylinders installed in brake calipers 34b in response to commands sent from the brake ECU 30 to press brake pads to brake discs 34a by the hydraulic pressure to generate friction braking force. Thus, the brake ECU 30 can control the braking force applied to the vehicle to change the accelerated state of the vehicle, i.e., a deceleration or a negative acceleration of the vehicle by controlling the brake actuators 33.

In addition, the control ECU 10 is electrically connected to a speaker 41 and a displaying device 42. The displaying device 42 is a multi-information display provided in front of a driver's seat. The displaying device 42 displays measured values such as the vehicle moving speed Vs and an engine speed, and various information. It should be noted that the displaying device 42 may be a head-up display.

The control ECU 10 outputs alerting sounds for alerting the driver from the speaker 41 while the control ECU 10 executes the driving force limiting control described later. In addition, the control ECU 10 displays messages that the accelerator pedal 51 is pressed and alerting marks such as a warning lamp on the displaying device 42.

<Driving Force Control>

Next, a driving force control executed by the control ECU 10 will be described. In this embodiment, the driving force control includes a normal driving force control and the driving force limiting control.

The control ECU 10 determines whether a predetermined mistaken operation condition is satisfied. The predetermined mistaken operation condition is a condition used to determine whether the driver mistakenly operates the accelerator pedal 51. The predetermined mistaken operation condition will be described later in detail.

When the predetermined mistaken operation condition is not satisfied, the control ECU 10 executes the normal driving force control. On the other hand, when the predetermined mistaken operation condition is satisfied, the control ECU 10 executes the driving force limiting control instead of the normal driving force control.

<Normal Driving Force Control>

Figure 2:
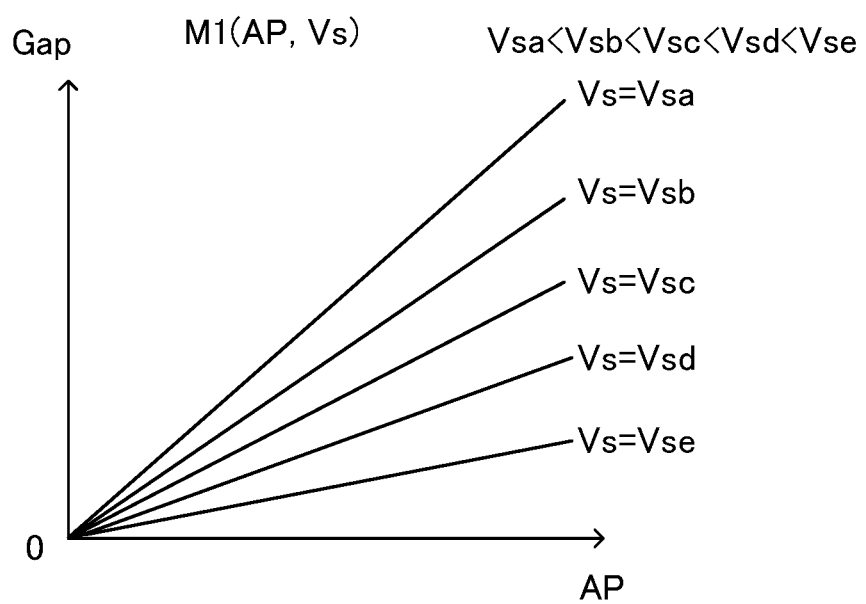
FIG. 2 is a view which shows a normal acceleration map M1 which is used in executing a normal driving force control.

When the predetermined mistaken operation condition is not satisfied, the control ECU 10 executes the normal driving force control as described below. Each time a first time elapses, the control ECU 10 acquires a requested acceleration Gap, depending on the vehicle moving speed Vs and the accelerator pedal operation amount AP by applying the accelerator pedal operation amount AP and the vehicle moving speed Vs to a normal acceleration map M1(AP, Vs) shown in FIG. 2. According to the normal acceleration map M1(AP, Vs), as the accelerator pedal operation amount AP increases, the requested acceleration Gap increases, and as the vehicle moving speed Vs increases, the requested acceleration Gap increases.

Then, the control ECU 10 sets the requested acceleration Gap as a target acceleration Gtgt and sends the target acceleration Gtgt to the engine ECU 20. Then, the engine ECU 20 controls the engine actuators 23 so as to control an actual acceleration Ga to the target acceleration Gtgt.

<Driving Force Limiting Control>

Figure 3:
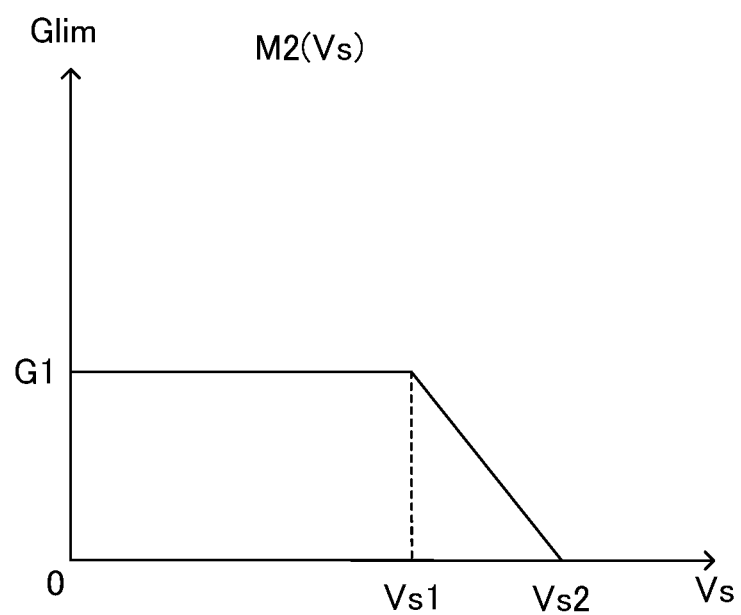
FIG. 3 is a view which shows a limited acceleration map M2 which is used in executing a driving force limiting control.

When the predetermined mistaken operation condition is satisfied, the control ECU 10 executes the driving force limiting control. Similar to the normal driving control, each time the first time elapses, the control ECU 10 acquires the requested acceleration Gap from the normal acceleration map M1(AP, Vs). In addition, each time the first time elapses, the control ECU 10 acquires an upper limit acceleration Glim, depending on the vehicle moving speed Vs by applying the vehicle moving speed Vs to a limited acceleration map M2(Vs) shown in FIG. 3. According to the limited acceleration map M2(Vs), the upper limit acceleration Glim is a constant acceleration G1 when the vehicle moving speed Vs is between zero and a speed Vs1. In addition, as the vehicle moving speed Vs increases from the speed Vs1, the upper limit acceleration Glim decreases. In addition, when the vehicle moving speed Vs is greater than or equal to a speed Vs2 (>Vs1), the upper limit acceleration Glim is zero.

Each time the first time elapses, the control ECU 10 sets smaller one of the requested acceleration Gap and the upper limit acceleration Glim as the target acceleration Gtgt. Then, the control ECU 10 sends the target acceleration Gtgt to the engine ECU 20. Then, the engine ECU 20 controls the engine actuators 23 so as to control the actual acceleration Ga to the target acceleration Gtgt.

As described above, when the control ECU 10 executes the driving force limiting control, the target acceleration Gtgt is limited to or smaller than the upper limit acceleration Glim, depending on the vehicle moving speed Vs. Thus, when the driver carries out the mistaken operation to the accelerator pedal 51, the control ECU 10 can control the driving force applied to the vehicle VA to prevent the actual acceleration Ga from exceeding the upper limit acceleration Glim. In other words, when the control ECU 10 determines that the predetermined mistaken operation condition becomes satisfied, the control ECU 10 controls the driving force which is applied to the vehicle VA, changes, depending on the accelerator pedal operation amount AP, and corresponds to the actual acceleration, to a smaller driving force, compared with when the predetermined mistaken operation condition is not satisfied, i.e., when the control ECU 10 executes the normal driving force control.

<Predetermined Mistaken Operation Condition>

The inventors of this application have got knowledge described below after studying past data on the mistaken operation to the accelerator pedal.

Figure 4:
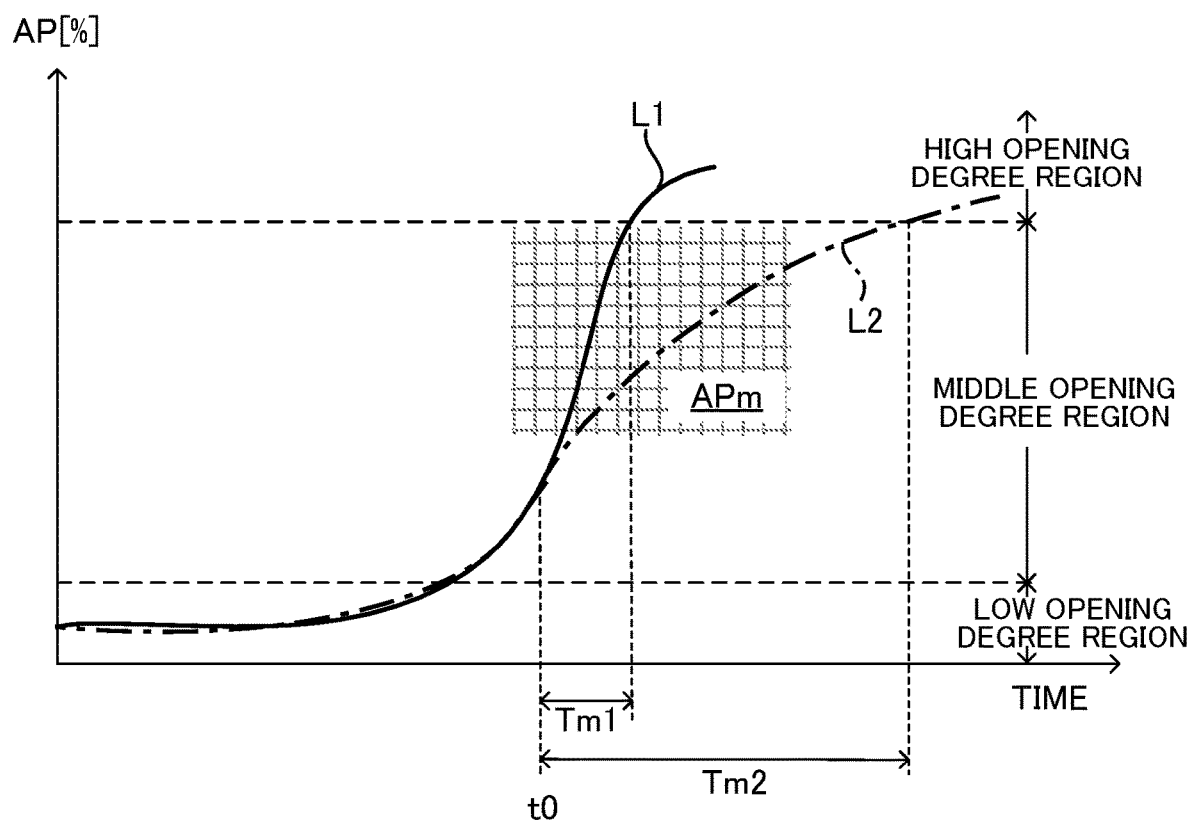
FIG. 4 is a view which shows an example of a change of an accelerator pedal operation amount AP with time when a mistaken operation to an accelerator pedal is carried out and an example of the change of the accelerator pedal operation amount AP with time when an intentional operation to the accelerator pedal is carried out.

FIG. 4 shows an example of a change of the accelerator pedal operation amount AP, i.e., the accelerator opening degree [%] with time when the mistaken operation to the accelerator pedal is carried out (see a solid line L1), and an example of the change of the accelerator pedal operation amount AP, i.e., the accelerator opening degree [%] with time when the intentionally operation to the accelerator pedal is carried out (see a dash-dot-dash line L2). In FIG. 4, a low opening degree region is, for example, a region of the accelerator opening degree from zero to a degree smaller than 20 [%]. A middle opening degree region is, for example, a region of the accelerator opening degree from a degree greater than or equal to 20 [%] to a degree smaller than 80 [%]. A high opening degree region is, for example, a region of the accelerator opening degree greater than or equal to 80 [%]. It should be noted that hereinafter, an amount of change of the accelerator pedal operation amount AP per unit time will be referred to as "accelerator pedal operation speed APV [%/s]" or "accelerator opening degree speed APV [%/s]".

When the accelerator pedal is mistakenly operated, the accelerator pedal operation speed APV increases within the middle opening degree region and at a point in time t0, the accelerator pedal operation speed APV takes a value greater than or equal to a positive threshold (in this embodiment, a first operation speed threshold APVth). Then, when a relatively short time (Tm1) elapses since the point in time t0, the accelerator pedal operation amount AP reaches the high opening degree region. This can be because the driver is panicked and strongly presses the accelerator pedal 51.

On the other hand, when the accelerator pedal is intentionally and strongly operated, the accelerator pedal operation speed APV also increases within the middle opening degree region and at the point in time t0, the accelerator pedal operation speed APV becomes greater than or equal to the first operation speed threshold APVth1. However, after the point in time t0, the accelerator pedal operation speed APV slightly decreases. This can be because the driver tends to initially make an operation of strongly pressing the accelerator pedal and then, relatively slowly press the accelerator pedal. Thus, the accelerator pedal operation amount AP reaches the high opening degree region at a time when a relatively long time (Tm2>Tm1) elapses since the point in time t0 when the accelerator pedal operation speed APV becomes greater than or equal to the first operation speed threshold APVth1. Alternatively, the accelerator pedal operation amount AP may not reach the high opening degree region after the point in time t0.

Accordingly, the first apparatus determines whether the accelerator pedal operation amount AP becomes greater than or equal to the first operation amount threshold APth1 within a predetermine time (in this embodiment, first time threshold Tath) since the accelerator pedal operation speed APV becomes greater than or equal to the first operation speed threshold APVth1. When the accelerator pedal operation amount AP becomes greater than or equal to the first operation amount threshold APth1 within the first time threshold Tath since the accelerator pedal operation speed APV becomes greater than or equal to the first operation speed threshold APVth1, the driver may carry out the mistaken operation to the accelerator pedal 51.

In particular, the control ECU 10 acquires the accelerator pedal operation amount AP (i.e., the accelerator pedal opening degree [%]) via the engine ECU 20 each a predetermined time (hereinafter, for convenience, this predetermined time will be referred to as "first time (Tp1)") elapses. Then, the control ECU 10 acquires the accelerator pedal operation speed APV. In particular, the control ECU 10 acquires a subtraction value dAP by subtracting the accelerator pedal operation amount AP acquired last time from the accelerator pedal operation amount AP acquired this time. In addition, the control ECU 10 acquires the accelerator pedal operation speed APV by dividing the subtraction value dAP by the first time Tp1 (i.e., a time interval of acquiring the accelerator pedal operation amount AP) (APV=dAP/Tp1).

The control ECU 10 determines whether a first condition is satisfied. The first condition becomes satisfied when a condition A1 described below becomes satisfied. It should be noted that the condition A1 will be also referred to as "operation speed condition".

Condition A1: The accelerator pedal operation speed APV is greater than or equal to a threshold (in this embodiment, a first operation speed threshold APVth1). For example, the first operation speed threshold APVth1 is set to a value greater than or equal to 70 [%/s]. Preferably, the first operation speed threshold APVth1 is set to a value greater than or equal to 90 [%/s]. More preferably, the first operation speed threshold APVth1 is set to a value greater than or equal to 100 [%/s]. In this embodiment, the first operation speed threshold APVth1 is set to a value of 100 [%/s].

When the first condition becomes satisfied, the control ECU 10 starts to measure time with a timer T. The timer T is a timer which measures an elapsed time Ta which elapses from a point in time when the first condition becomes satisfied.

After the first condition becomes satisfied, the control ECU 10 determines whether a second condition is satisfied. The second condition becomes satisfied when a condition B1 and a condition B2 both become satisfied.

Condition B1: The accelerator pedal operation amount AP is greater than or equal to the first operation amount threshold APth1. The first operation amount threshold APth1 is set to a value greater than or equal to a lower limit value, for example, the accelerator pedal opening degree of 80 [%] of the high opening degree region. Preferably, the first operation amount threshold APth1 is set to a value greater than or equal to 90 [%]. In this embodiment, the first operation amount threshold APth1 is set to a value of 90 [%].

Condition B1: The elapsed time Ta is shorter than or equal to the first time threshold Tath in point in time when the condition B1 becomes satisfied. For example, the first time threshold Tath is set to a value smaller than or equal to 0.5 s. The first time threshold Tath may be set to a value smaller than or equal to 0.3 s. In this embodiment, the first time threshold Tath is set to a value of 0.5 s.

When the first and second conditions are satisfied, the control ECU 10 determines that the mistaken operation to the accelerator pedal 51 may be carried out by the driver.

In this regard, after further studying the past data, the inventors have got knowledge that the driver intentionally operates the accelerator pedal 51 in a situation described below even when the first and second conditions become satisfied. That is, the driver stops the vehicle VA by pressing the brake pedal 52. Then, the driver strongly presses the accelerator pedal 51 to start the vehicle VA. In this situation, the driver operates the brake pedal 52 just before pressing the accelerator pedal 51. Thus, the driver distinguishes the accelerator pedal 51 and the brake pedal 52 from each other. In other words, the driver intentionally and strongly operates the accelerator pedal 51. Thus, the driver does not carry out the mistaken operation to the accelerator pedal 51.

On the other hand, when the driver has not operated the brake pedal 52 for a long time, the driver may not distinguish the accelerator pedal 51 and the brake pedal 52 from each other. In particular, when (i) a long time elapses since the driver stops operating the brake pedal 52, and (ii) the first and second conditions become satisfied, the mistaken operation to the accelerator pedal is probably carried out.

Accordingly, the control ECU 10 determines whether a third condition described below is satisfied when the first and second conditions become satisfied. Thus, in this embodiment, the predetermined mistaken operation condition includes the first, second, and third conditions.

The third condition becomes satisfied when a condition C1 described below becomes satisfied.

Condition C1: An elapsed time Tb which elapses since the control ECU 10 receives the OFF signal from the brake switch 32, is longer than or equal to a predetermined time (in this embodiment, a second time threshold Tbth). For example, the second time threshold Tbth is set to a value smaller than or equal to 5 s. Preferably, the second time threshold Tbth is set to a value smaller than or equal to 3 s. In this embodiment, the second time threshold Tbth is set to a value of 2 s.

The elapsed time Tb corresponds to a period that the signal sent from the brake switch 32 continues to be the OFF signal since a brake-off time when the signal sent from the brake switch 32 changes from the ON signal to the OFF signal. In other words, the elapsed time Tb corresponds to a period that the brake pedal 52 has not been operated since the driver stops operating the brake pedal 52.

It should be noted that when the control ECU 10 receives the ON signal from the brake switch 32, the control ECU 10 sets a value of the elapsed time Tb to zero and then, starts to measure the elapsed time Tb at a point in time when the control ECU 10 receives the OFF signal.

When the third condition is satisfied at a point in time when the second condition becomes satisfied, the control ECU 10 determines that the predetermined mistaken operation condition becomes satisfied. In this case, the control ECU 10 executes the driving force limiting control instead of the normal driving force control.

On the other hand, when the third condition is not satisfied at a point in time when the second condition becomes satisfied, the control ECU 10 repeatedly determines whether the third condition becomes satisfied until the elapsed time Ta exceeds the first time threshold Tath. Then, the control ECU 10 determines that the predetermined mistaken operation condition is not satisfied when the third condition is not satisfied at a point in time when the elapsed time Ta exceeds the first time threshold Tath. In this case, the control ECU 10 continues executing the normal driving force control.

Figure 5:
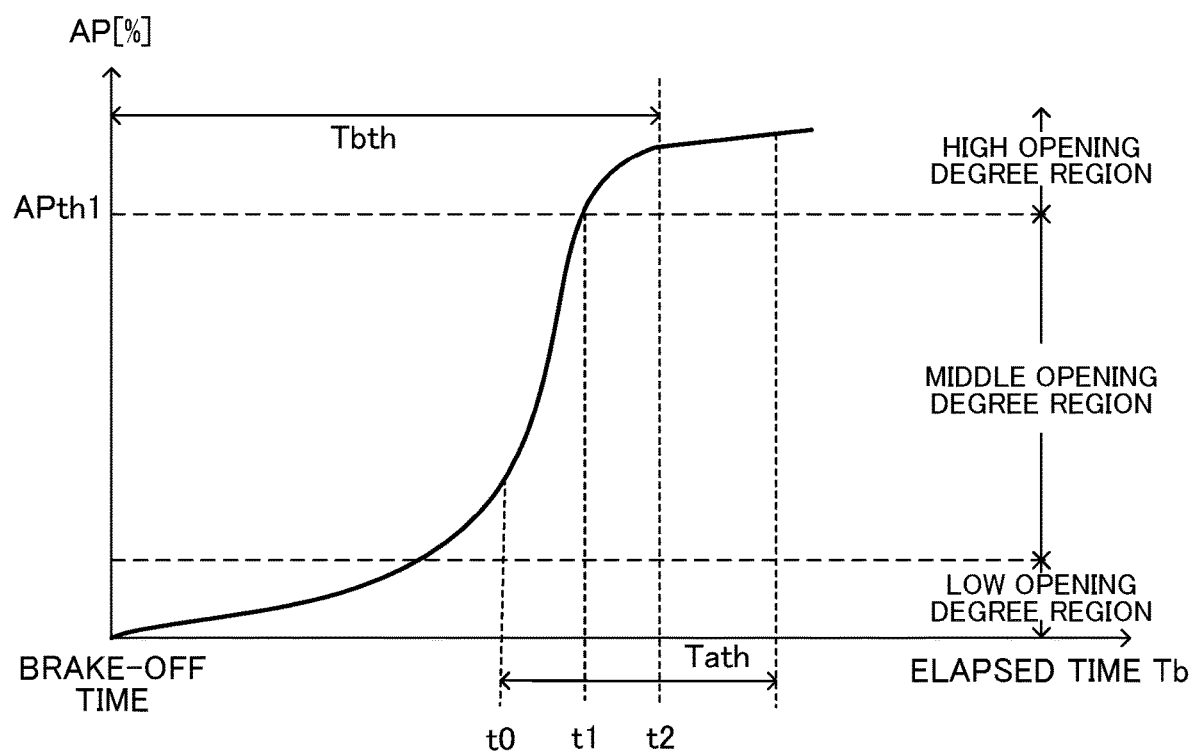
FIG. 5 is a view which shows an example of the change of the accelerator pedal operation amount AP with time after a brake-off time when the intentional operation to the accelerator pedal is carried out.

In this regard, a determination of the third condition as described above may lead to a problem described below. FIG. 5 shows an example of a change of the accelerator pedal operation amount AP with time from the brake-off time. A horizontal axis of FIG. 5 represents the elapsed time Tb from the brake-off time. FIG. 5 shows an example that the driver intentionally and strongly operates the accelerator pedal 51. Thus, the operation shown in FIG. 5 is not the mistaken operation to the accelerator pedal 51.

In this example, the first condition becomes satisfied in a point in time t0. Then, the second condition becomes satisfied at a point in time t1. At the point in time t1, the third condition is not satisfied. However, at a point in time t2 before the elapsed time Ta reaches the first time threshold Tath, the elapsed time Tb reaches the second time threshold Tbth. Thus, the third condition becomes satisfied. As a result, the control ECU 10 determines that the predetermined mistaken operation condition becomes satisfied at the point in time t2 and starts to execute the driving force limiting control. Thus, even when the mistaken operation to the accelerator pedal is not carried out, the vehicle VA is not accelerated.

Accordingly, when the third condition is not satisfied at a point in time when the second condition becomes satisfied, the control ECU 10 executes processes described below. In the example shown in FIG. 5, the driver keeps strongly pressing the accelerator pedal 51 even after the second condition becomes satisfied. The accelerator pedal operation speed APV becomes smaller than the accelerator pedal operation speed APV of the point in time t1 when the second condition becomes satisfied, but the accelerator pedal operation amount AP is still in the high opening degree region. Thus, the control ECU 10 determines whether (i) the accelerator pedal operation speed APV decreases to a predetermined value, and (ii) the accelerator pedal operation amount AP is in the high opening degree region. When a condition that (i) the accelerator pedal operation speed APV decreases to the predetermined value, and (ii) the accelerator pedal operation amount AP is in the high opening degree region, becomes satisfied after the second condition becomes satisfied, the driver probably intentionally operates the accelerator pedal 51.

In particular, the control ECU 10 determines whether a pressing condition described below is satisfied. The pressing condition is a condition which is satisfied when (i) the first and second conditions are satisfied, and (ii) the driver probably intentionally operates the accelerator pedal 51. In particular, the pressing condition is satisfied when a condition D1 and a condition D2 described below are both satisfied.

Condition D1: The accelerator pedal operation amount AP is greater than or equal to a threshold (in this embodiment, a second operation amount threshold APth2). The second operation amount threshold APth2 is set to a value greater than or equal to the lower limit value, for example, the accelerator pedal opening degree of 80 [%] of the high opening degree region. Preferably, the second operation amount threshold APth2 is set to a value greater than or equal to 90 [%]. In this embodiment, the second operation amount threshold APth2 is set to the same value as the first operation amount threshold APth1, i.e., 90 [%].

Condition D2: The accelerator pedal operation speed APV is smaller than or equal to a predetermined positive value (in this embodiment, a second operation speed threshold APBth2). For example, the second operation speed threshold APVth2 is set to a value smaller than or equal to the first operation speed threshold APVth1. For example, the second operation speed threshold APVth2 is set to a value smaller than or equal to 100 [%/s]. In this embodiment, the second operation speed threshold APVth2 is set to a value of 100 [%/s].

When (i) the third condition becomes satisfied within the first time threshold Tath since the point in time t1 when the first condition becomes satisfied, and (ii) the pressing condition is satisfied before the third condition becomes satisfied, the control ECU 10 determines that the predetermined mistaken operation condition is not satisfied. In this case, the control ECU 10 continues executing the normal driving force control without executing the driving force limiting control.

It should be noted that the control ECU 10 determines whether a predetermined condition (in this embodiment, a terminating condition) is satisfied after a point in time when the control ECU 10 starts to execute the driving force limiting control, i.e., after a point in time when the predetermined mistaken operation condition becomes satisfied. The terminating condition is a condition which becomes satisfied when the mistaken operation to the accelerator pedal 51 is stopped being carried out. In particular, the terminating condition becomes satisfied when the accelerator pedal operation amount AP becomes smaller than or equal to a predetermined threshold (in this embodiment, a terminating threshold APeth). The terminating threshold APeth is a value which the accelerator pedal operation amount AP reaches when the driver decreases a pressing degree to the accelerator pedal 51 or stops pressing the accelerator pedal 51. Thus, the terminating threshold APeth is, for example, a value within the low opening degree region, for example, a value greater than or equal to zero and smaller than 20 [%], in this embodiment, a value of 10 [%].

<Example of Operations>

Figure 6:
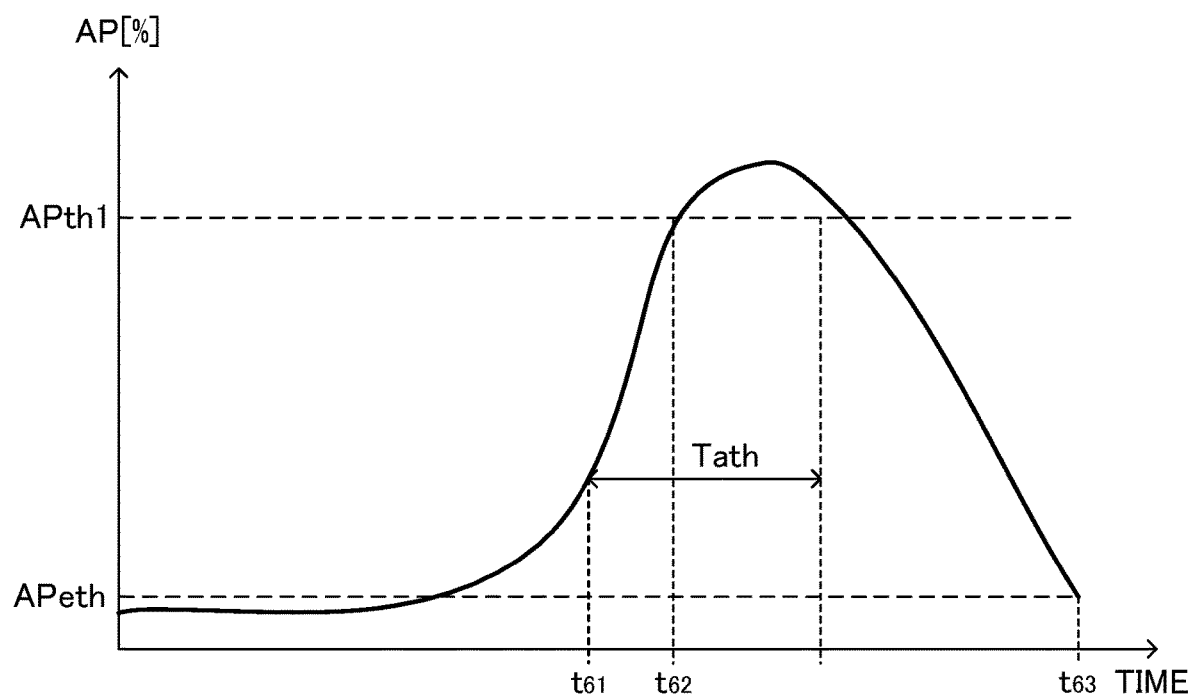
FIG. 6 is a view which shows an example of the change of the accelerator pedal operation amount AP with time when the mistaken operation to the accelerator pedal is carried out.

An example of operations of the first apparatus when the mistaken operation to the accelerator pedal 51 is carried out, will be described with reference to FIG. 6.

<Point in Time t61>

At a point in time t61, the accelerator pedal operation speed APV becomes greater than or equal to the first operation speed threshold APVth1. Thus, the control ECU 10 performs an activation a1 and an activation a2 described below.

Activation a1: The control ECU 10 determines that the first condition becomes satisfied.

Activation a2: The control ECU 10 starts a measurement with the timer T. Thereby, the control ECU 10 measures the elapsed time Ta from a point in time (the point in time t61) when the first condition becomes satisfied.

It should be noted that at the point in time t61, only the first condition is satisfied, and thus the control ECU 10 continues executing the normal driving force control.

<Point in Time t62>

At a point in time t62, the accelerator pedal operation amount AP becomes greater than or equal to the first operation amount threshold APth1. If the elapsed time Tb is longer than or equal to the second time threshold Tbth at this time, the control ECU 10 performs activations a3 to a7 described below.

Activation a3: The control ECU 10 determines that the condition B1 becomes satisfied.

Activation a4: The control ECU 10 determines that the condition B2 becomes satisfied since the elapsed time Ta is shorter than or equal to the first time threshold Tath at a point in time when the condition B1 becomes satisfied. Thus, the control ECU 10 determines that the second condition becomes satisfied.

Activation a5: The control ECU 10 determines that the third condition becomes satisfied since the elapsed time Tb is longer than or equal to the second time threshold Tbth at a point in time when the second condition becomes satisfied.

Activation a6: The control ECU 10 determines that the predetermined mistaken operation condition becomes satisfied. Thus, the control ECU 10 starts to execute the driving force limiting control.

Activation a7: The control ECU 10 execute a predetermined process to the driver (hereinafter, this predetermined process will be referred to as "alerting process"). In particular, the CPU outputs the alerting sounds for alerting the driver from the speaker 41. In addition, the CPU displays the messages which indicate that the accelerator pedal 51 is pressed, and the alerting marks on the displaying device 42.

In general, the mistaken operation to the accelerator pedal 51 occurs when the vehicle moving speed Vs is low. In an example shown in FIG. 6, the vehicle moving speed Vs is lower than the speed Vs1 at the point in time t62. The control ECU 10 acquires the requested acceleration Gap from the normal acceleration map M1(AP, Vs). The vehicle moving speed Vs is low, and the accelerator pedal operation amount AP is great. Thus, the requested acceleration Gap is considerably great. In addition, the control ECU 10 acquires the upper limit acceleration Glim from the limited acceleration map M2(Vs). In this case, the upper limit acceleration Glim is the acceleration G1 and is considerably smaller than the requested acceleration Gap. Thus, the control ECU 10 sets the upper limit acceleration G1 as the target acceleration Gtgt and sends the target acceleration Gtgt to the engine ECU 20. As a result, the moving state of the vehicle VA is controlled with preventing the actual acceleration Ga from exceeding the upper limit acceleration G1. Thus, the vehicle VA is prevented from being rapidly accelerated.

<Point in Time t63>

Between the point in time t62 and a point in time t63, the driver returns the accelerator pedal 51 in response to the alerting process. Then, at the point in time t63, the accelerator pedal operation amount AP becomes smaller than or equal to the terminating threshold APeth. Thus, the terminating condition becomes satisfied. Thus, the control ECU 10 terminates executing the driving force limiting control and restarts to execute the normal driving force control.

Figure 7:
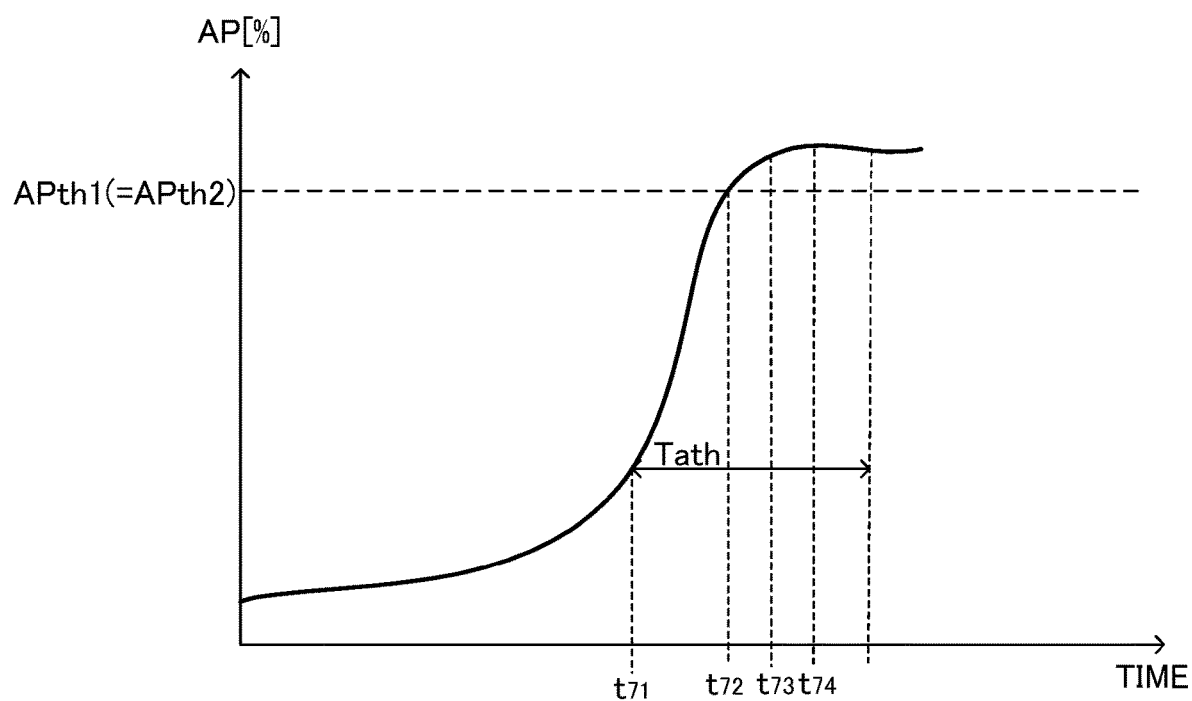
FIG. 7 is a view which shows an example of the change of the accelerator pedal operation amount AP with time when the intentional operation to the accelerator pedal is carried out.

Next, an example of operations of the first apparatus when the intentional operation to the accelerator pedal 51 is carried out, will be described with reference to FIG. 7.

<Point in Time t71>

At a point in time t71, the accelerator pedal operation speed APV becomes greater than or equal to the first operation speed threshold APVth1. In this case, the control ECU 10 performs activations b1 and b2 described below.

Activation b1: The control ECU 10 determines that the first condition becomes satisfied.

Activation b2: The control ECU 10 starts the measurement with the timer T.

It should be noted that at this point in time, the control ECU 10 continues executing the normal driving force control.

<Point in Time t72>

At a point in time t72, the accelerator pedal operation amount AP becomes greater than or equal to the first operation amount threshold APth1. If the elapsed time Tb is shorter than the second time threshold Tbth at this point in time, the control ECU 10 performs activations b3 to b6 described below.

Activation b3: The control ECU 10 determines that the condition B1 becomes satisfied.

Activation b4: The control ECU 10 determines that the second condition becomes satisfied since the elapsed time Ta is shorter than or equal to the first time threshold Tath, and the condition B2 becomes satisfied at a point in time when the condition B1 becomes satisfied.

Activation b5: The control ECU 10 determines that the third condition is not satisfied since the elapsed time Tb is shorter than the second time threshold Tbth at a point in time when the second condition becomes satisfied.

Activation b6: The control ECU 10 starts a determining process of determining whether the pressing condition described above is satisfied. In this case, the control ECU 10 repeatedly determines whether the pressing condition is satisfied after the point in time t72.

<Point in Time t73>

At a point in time t73, the accelerator pedal operation amount AP is greater than or equal to the second operation amount threshold APth2. Thus, the condition D1 is satisfied. In addition, the accelerator pedal operation speed APV is smaller than or equal to the second operation speed threshold APVth2. Thus, the condition D2 is satisfied. Thus, the control ECU 10 determines that the pressing condition is satisfied. At this point in time, the elapsed time Tb is shorter than the second time threshold Tbth. Thus, the control ECU 10 continues executing the normal driving force control.

<Point in Time t74>

At a point in time t74 within the first time threshold Tath since the point in time t71 when the first condition becomes satisfied, the elapsed time Tb becomes longer than or equal to the second time threshold Tbth. Thus, the condition C1 becomes satisfied. Thus, the control ECU 10 determines that the third condition becomes satisfied. In this regard, the pressing condition has been satisfied at a point in time t73 before the third condition becomes satisfied. Thus, the control ECU 10 determines that the predetermined mistaken operation condition is not satisfied. Thus, the control ECU 10 determines that the intentional operation to the accelerator pedal 51 is carried out. Thus, the control ECU 10 continues executing the normal driving force control.

It should be noted that as another example, the control ECU 10 determines that the predetermined mistaken operation condition is not satisfied when the third condition does not become satisfied within the first time threshold Tath since the point in time t71 when the first condition becomes satisfied. In this case, the control ECU 10 continues executing the normal driving force control.

<Operations>

Figure 8:
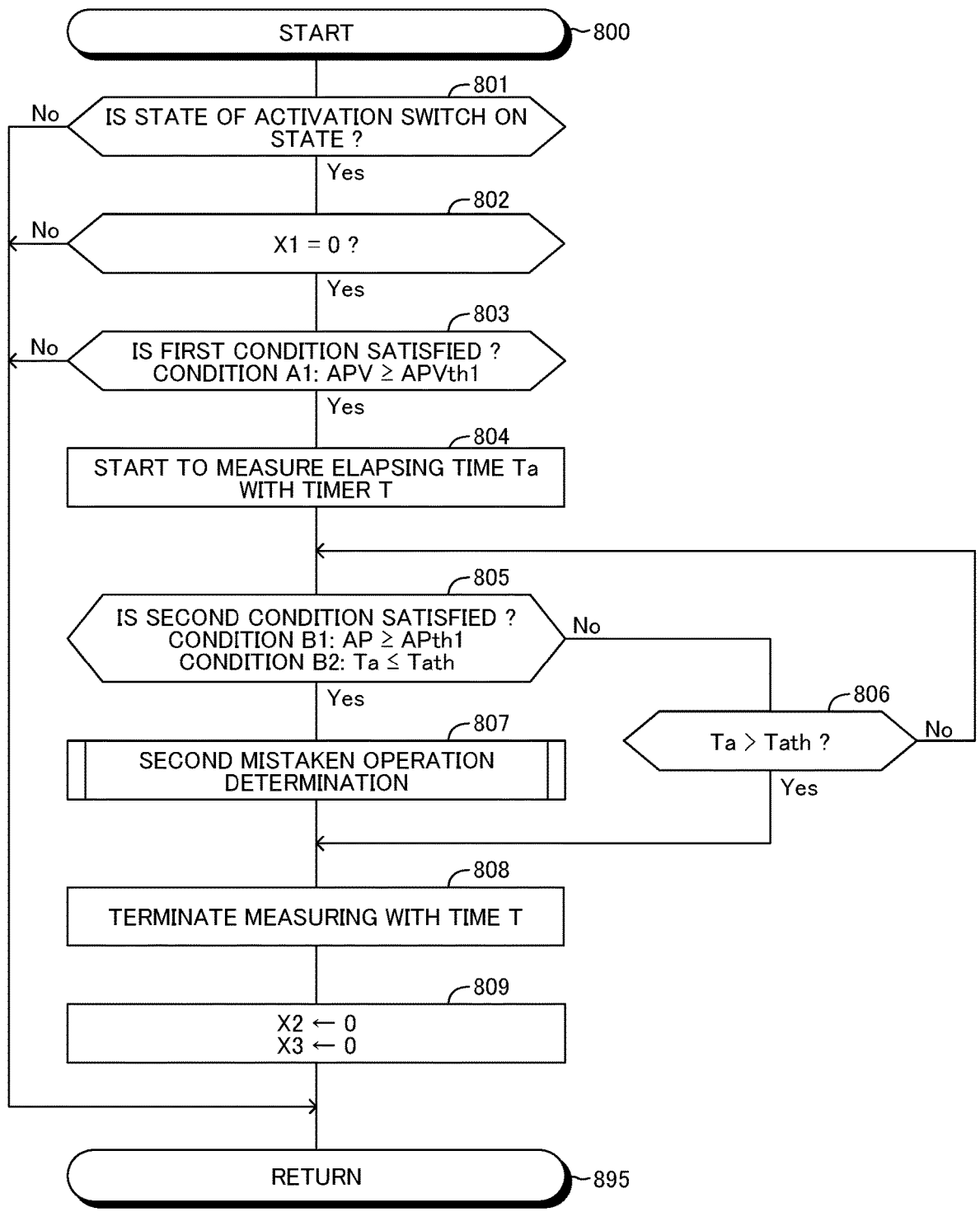
FIG. 8 is a view which shows a flowchart of a first mistaken operation determining routine executed by a control ECU.

The CPU of the control ECU 10 is configured or programmed to execute a first mistaken operation determining routine shown in FIG. 8 each time a predetermined time (for example, the first time) elapses.

It should be noted that the CPU receive the detection signals or the output signals from the sensors (11, 12, 32, 22, and 31) and the switches (13, 14, and 32) each time the first time elapses and stores the received signals in the RAM.

At a predetermined timing, the CPU starts a process from a step 800 of the routine shown in FIG. 8 and proceeds with the process to a step 801 to determine whether the state of the activation switch 14 is the ON state. When the state of the activation switch 14 is not the ON state, the CPU determines "No" at the step 801 and proceeds with the process directly to a step 895 to terminate executing this routine once.

On the other hand, when the state of the activation switch 14 is the ON state, the CPU determines "Yes" at the step 801 and proceeds with the process to a step 802 to determine whether a value of a first flag X1 is "0". The first flag X1 represents that the driving force limiting control is not executed when the value of the first flag X1 is "0". On the other hand, when the value of the first flag X1 is "1", the first flag X1 represents that the driving force limiting control is executed. It should be noted that the value of the first flag X1 is set to "0" when an ignition switch not shown is turned from OFF to ON in an initializing routine which the CPU executes.

When the value of the first flag X1 is not "0", the CPU determines "No" at the step 802 and proceeds with the process directly to the step 895 to terminate executing this routine once.

When the value of the first flag X1 is "0", the CPU determines "Yes" at the step 802 and proceeds with the process to a step 803 to determine whether the first condition is satisfied. When the first condition is not satisfied, the CPU determines "No" at the step 803 and proceeds with the process directly to the step 895 to terminate executing this routine once.

On the other hand, when the first condition is satisfied, the CPU determines "Yes" at the step 803 and proceeds with the process to a step 804. At the step 804, the CPU resets the timer T. Then, the CPU starts to measure the elapsed time Ta with the timer T. Next, the CPU proceeds with the process to a step 805 to determine whether second condition is satisfied.

When the second condition is satisfied, the CPU determines "Yes" at the step 805 and sequentially executes processes of steps 807 to 809 described below. Then, the CPU proceeds with the process to the step 895 to terminate executing this routine once.

Step 807: The CPU executes a second mistaken operation determining routine shown in FIG. 9. Details of the routine shown in FIG. 9 will be described later.

Step 808: The CPU terminates measuring with the timer T.

Step 809: The CPU sets a value of a second flag X2 to "0" and set a value of a third flag X3 to "0". The second flag X2 is set to "1" when the third condition is not satisfied at a point in time when the second condition becomes satisfied. The value of the second flag X2 is set by the routine shown in FIG. 9. When the value of the second flag X2 is set to "1", the determining process of determining whether the pressing condition is satisfied, is started to be executed (see FIG. 10). The value of the third flag X3 is set by a routine shown in FIG. 10. The value of the third flag X3 is set to "1" when the pressing condition becomes satisfied. It should be noted that the values of the second and third flags X2 and X3 are set to "0" by the initializing routine.

On the other hand, when the second condition is not satisfied, the CPU determines "No" at the step 805 and proceeds with the process to a step 806 to determine whether the elapsed time Ta is longer than the first time threshold Tath. When the elapsed time Ta is shorter than or equal to the first time threshold Tath, the CPU determines "No" at the step 806 and returns to the step 805 to determine whether the second condition is satisfied. It should be noted that the CPU continues acquiring latest information on the accelerator pedal operation amount AP from the accelerator pedal operation amount sensor 21 while the CPU repeatedly executes the processes of the steps 805 and 806.

When the elapsed time Ta becomes longer than the first time threshold Tath without the second condition becoming satisfied after the measurement of the elapsed time Ta with the timer T is started, the CPU determines "Yes" at the step 806 and sequentially executes the process of the steps 808 and 809 described above. Then, the CPU proceeds with the process to the step 895 to terminate executing this routine once.

Next, a routine which the CPU executes at the step 807 of the routine shown in FIG. 8, will be described. When the CPU proceeds with the process to the step 807, the CPU starts a process from a step 900 of the routine shown in FIG. 9 and proceeds with the process to a step 901. At the step 901, the CPU determines whether the third condition is satisfied. When the third condition is satisfied, the CPU determines "Yes" at the step 901 and proceeds with the process to a step 904 to determine whether the value of the third flag X3 is "0". When the value of the third flag X3 is "0", the CPU determines "Yes" at the step 904 and proceeds with the process to a step 905 to set the value of the first flag X1 to "1". Then, the CPU proceeds with the process to a step 995 to terminate executing this routine and proceeds with the process to the step 808 of the routine shown in FIG. 8. In this case, the value of the first flag X1 is set to "1" and thus, the CPU executes the driving force limiting control as described below (see FIG. 11).

On the other hand, when the third condition is not satisfied, the CPU determines "No" at the step 901 and proceeds with the process to a step 902 to set the value of the second flag X2 to "1". Thereby, the CPU repeatedly determines whether the pressing condition is satisfied as described later (see FIG. 10). Next, the CPU proceeds with the process to a step 903 to determine whether the elapsed time Ta is longer than the first time threshold Tath. When the elapsed time Ta is shorter than or equal to the first time threshold Tath, the CPU determines "No" at the step 903 and returns to the step 901 to determine whether the third condition is satisfied. In this case, the CPU repeatedly executes the processes of the steps 901 to 903. When the elapsed time Ta becomes longer than the first time threshold Tath without the third condition becoming satisfied, the CPU determines "Yes" at the step 903 and proceeds with the process directly to the step 995 to terminate executing this routine. Then, the CPU proceeds with the process to the step 808 of the routine shown in FIG. 8. In this case, the value of the first flag X1 is "0", and thus the CPU executes the normal driving force control as described later (see FIG. 11).

Figure 10:
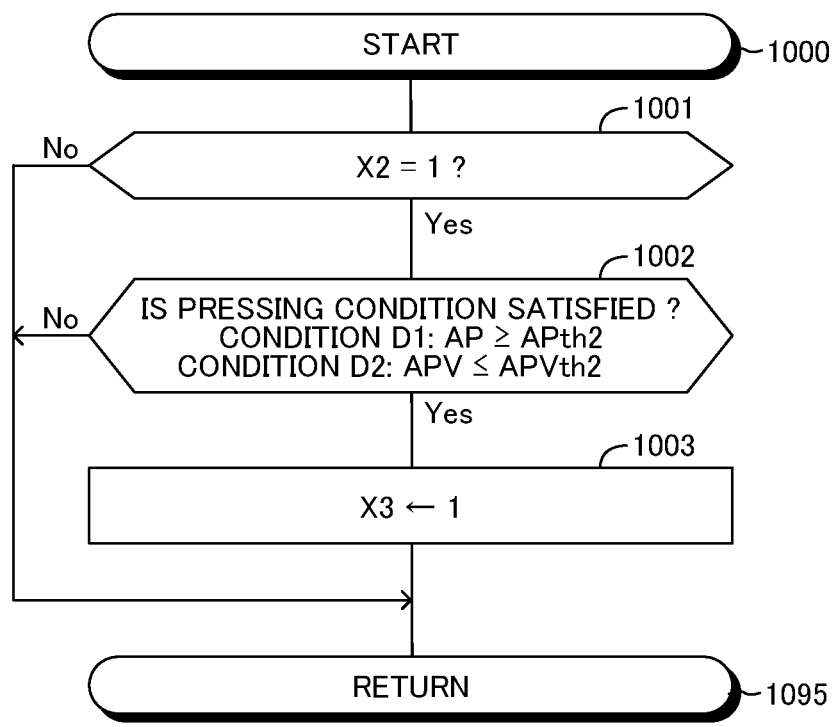
FIG. 10 is a view which shows a flowchart of a pressing condition determining routine executed by the control ECU.

When (i) the CPU sets the value of the third flag X3 to "1" by the routine shown in FIG. 10 while the CPU repeatedly executes the processes of the steps 901 to 903, and (ii) the third condition becomes satisfied after the CPU sets value of the third flag X3 to "1", the CPU determines "Yes" at the step 901 and proceeds with the process to the step 904. Then, the CPU determines "No" at the step 904 and proceeds with the process directly to the step 995 to terminate executing this routine. Then, the CPU proceeds with the process to the step 808 of the routine shown in FIG. 8. In this case, the value of the first flag X1 is "0" and thus, the CPU executes the normal driving force control as described later (see FIG. 11).

It should be noted that when the CPU does not set the value of the third flag X3 to "1" by the routine shown in FIG. 10, i.e., when the pressing condition is not satisfied, the CPU determines "Yes" at the step 904 and proceeds with the process to the step 905. Then, the CPU proceeds with the process to the step 995 to terminate executing this routine and proceeds with the process to the step 808 of the routine shown in FIG. 8.

The CPU configured or programmed to execute a pressing condition determining routine shown in FIG. 10 each time the first time elapses. The CPU starts a process from a step 1000 of the routine shown in FIG. 10 and proceeds with the process to a step 1001 to determine whether the value of the second flag X2 is "1". When the value of the second flag X2 is not "1", the CPU determines "No" at the step 1001 and proceeds with the process directly to a step 1095 to terminate executing this routine once.

On the other hand, when the value of the second flag X2 is "1", the CPU determines "Yes" at the step 1001 and proceeds with the process to a step 1002 to determine whether the pressing condition is satisfied. When the pressing condition is satisfied, the CPU determines "Yes" at the step 1002 and proceeds with the process to a step 1003 to set the value of the third flag X3 to "1". Then, the CPU proceeds with the process to the step 1095 to terminate executing this routine once.

It should be noted that when the pressing condition is not satisfied, the CPU determines "No" at the step 1002 and proceeds with the process directly to the step 1095 to terminate executing this routine once.

Figure 11:
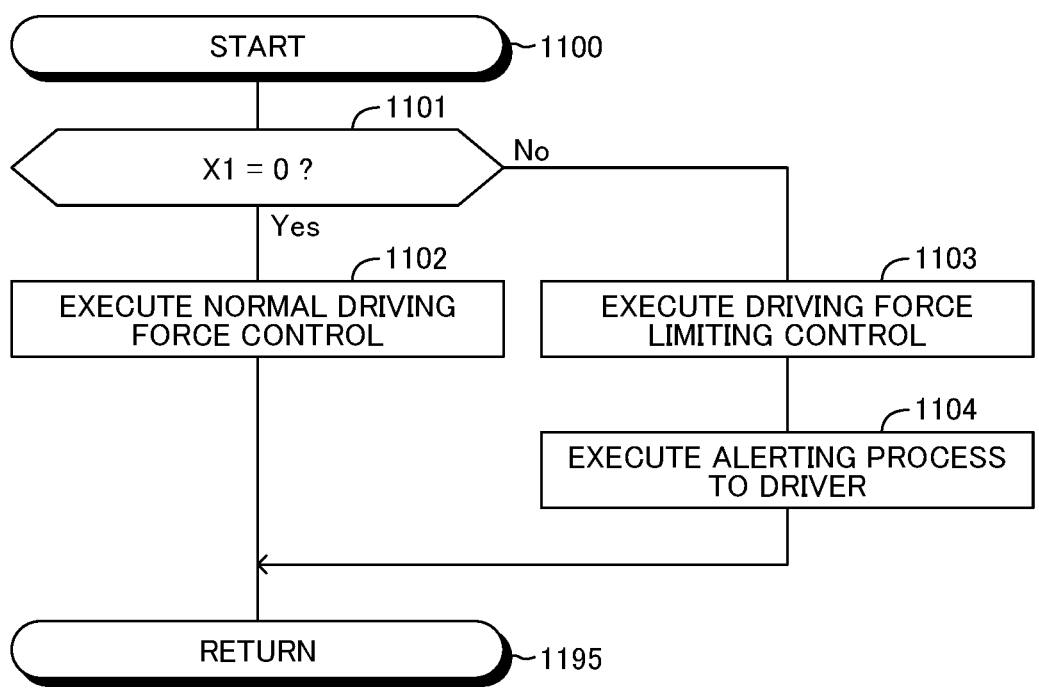
FIG. 11 is a view which shows a flowchart of a driving force control routine executed by the control ECU.

In addition, the CPU configured or programmed to execute a driving force control routine shown in FIG. 11 each time the first time elapses. The CPU starts a process from a step 1100 of the routine shown in FIG. 11 and proceeds with the process to a step 1101 to determine whether the value of the first flag X1 is "0". When the value of the first flag X1 is "0", the CPU determines "Yes" at the step 1101 and proceeds with the process to a step 1102. At the step 1102, the CPU executes the normal driving force control. Then, the CPU proceeds with the process to a step 1195 to terminate executing this routine once.

On the other hand, when the value of the first flag X1 is not "0", i.e., the value of the first flag X1 is "1", the CPU determines "No" at the step 1101 and sequentially executes processes of steps 1103 and 1104 described below. Then, the CPU proceeds with the process to the step 1195 to terminate executing this routine once.

Step 1103: The CPU executes the driving force limiting control.

Step 1104: The CPU executes the alerting process to the driver.

Figure 12:
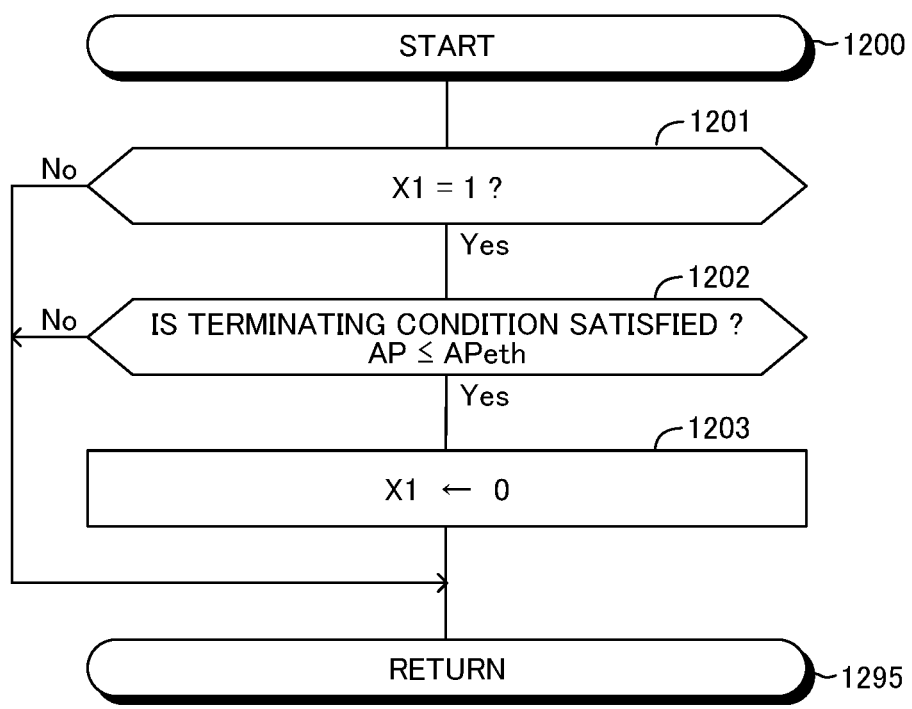
FIG. 12 is a view which shows a flowchart of a terminating determining routine executed by the control ECU.

In addition, the CPU is configured or programmed to execute a terminating determining routine shown in FIG. 12 each time the first time elapses. The CPU starts a process from a step 1200 of the routine shown in FIG. 12 and proceeds with the process to a step 1201 to determine whether the value of the first flag X1 is "1". When the value of the first flag X1 is not "1", the CPU determines "No" at the step 1201 and proceeds with the process directly to a step 1295 to terminate executing this routine once.

On the other hand, when the value of the first flag X1 is "1", the CPU determines "Yes" at the step 1201 and proceeds with the process to a step 1202 to determine whether the terminating condition is satisfied. When the terminating condition is not satisfied, the CPU determines "No" at the step 1202 and proceeds with the process directly to the step 1295 to terminate executing this routine once.

On the other hand, when the terminating condition is satisfied, the CPU determines "Yes" at the step 1202 and proceeds with the process to a step 1203 to set the value of the first flag X1 to "0". Thereby, the CPU determines "Yes" at the step 1101 of the routine shown in FIG. 11 and thus, the execution of the driving force limiting control and the alerting process are terminated and the execution of the normal driving force control is started.

As described above, the first apparatus can distinguish the mistaken operation to the accelerator pedal 51 from the intentional operation to the accelerator pedal 51 with high accuracy, using the first, second, and third conditions.

Further, a situation that (i) the third condition is not satisfied at a point in time when the second condition becomes satisfied, and (ii) the third condition becomes satisfied within the first time threshold Tath since a point in time when the first condition becomes satisfied, may occur. Also, in this situation, the first apparatus determines that the predetermined mistaken operation condition is not satisfied when the pressing condition is satisfied before the third condition becomes satisfied. Thus, the driving force limiting control is unlikely to be executed when the driver intentionally and strongly pressing the accelerator pedal 51 (see the examples shown in FIG. 5 and FIG. 7).

Second Embodiment

Next, the vehicle control apparatus according to a second embodiment of the invention will be described. Hereinafter, the vehicle control apparatus according to the second embodiment will be also referred to as "second apparatus". The second apparatus is different from the first apparatus in that the third condition is a condition which relates to the right and left direction indicators 61r and 61l. Below, mainly, the configuration of the second apparatus different from that of the first apparatus will be described.

When the states of the direction indicators 61r or 61l are the ON states, the vehicle VA may be accelerated to overtake a preceding vehicle. In this case, the driver intentionally and strongly operates the accelerator pedal 51.

Further, just after the states of the right or left direction indicators 61r or 61l change from the ON states to the OFF states, the vehicle VA may be overtaking the preceding vehicle. Also, in this case, the driver intentionally and strongly operates the accelerator pedal 51. Hereinafter, a point in time when the states of the right or left direction indicators 61r or 61l change from the ON states to the OFF states will be also referred to as "direction indicator off time".

Accordingly, the third condition may be a condition which becomes satisfied when a condition C2 described below becomes satisfied.

Condition C2: An elapsed time Tc which elapses since the direction indicator off time, is longer than or equal to a third time threshold Tcth. For example, the third time threshold Tcth is set to a value smaller than or equal to 5 s. Preferably, the third time threshold Tcth is set to a value smaller than or equal to 3 s. In this embodiment, the third time threshold Tcth is set to a value of 2 s. The elapsed time Tc is a time that the right or left direction indicators 61r or 61l keep the OFF state since the direction indicator off time.

It should be noted that when the control ECU 10 receives signals which represent that the right or left direction indicators 61r or 61l are in the ON state, from the direction indicator switch 13, the control ECU 10 sets a value of the elapsed time Tc to zero. Then, the control ECU 10 starts to measure the elapsed time Tc since a point in time when the control ECU 10 receives a signal which represents the right or left direction indicators 61r or 61l are in the OFF state, from the direction indicator switch 13.

Also, with this configuration, the problem described with reference to FIG. 5, may arise. When the condition C2 is not satisfied at a point in time when the second condition becomes satisfied, but the condition C2 becomes satisfied within the first time threshold Tath since the point in time when the first condition becomes satisfied and the driving force limiting control is executed, the problem that the vehicle VA is not accelerated even when the mistaken operation to the accelerator pedal is not carried out, arise. For example, the driving force applied to the vehicle VA is limited when the vehicle VA is overtaking the preceding vehicle.

Accordingly, the control ECU 10 determines that the predetermined mistaken operation condition is not satisfied when (i) the third condition (i.e., the condition C2) becomes satisfied within the first time threshold Tath since a point in time when the first condition becomes satisfied, and (ii) the pressing condition is satisfied before the third condition becomes satisfied.

<Operations>

Figure 9:
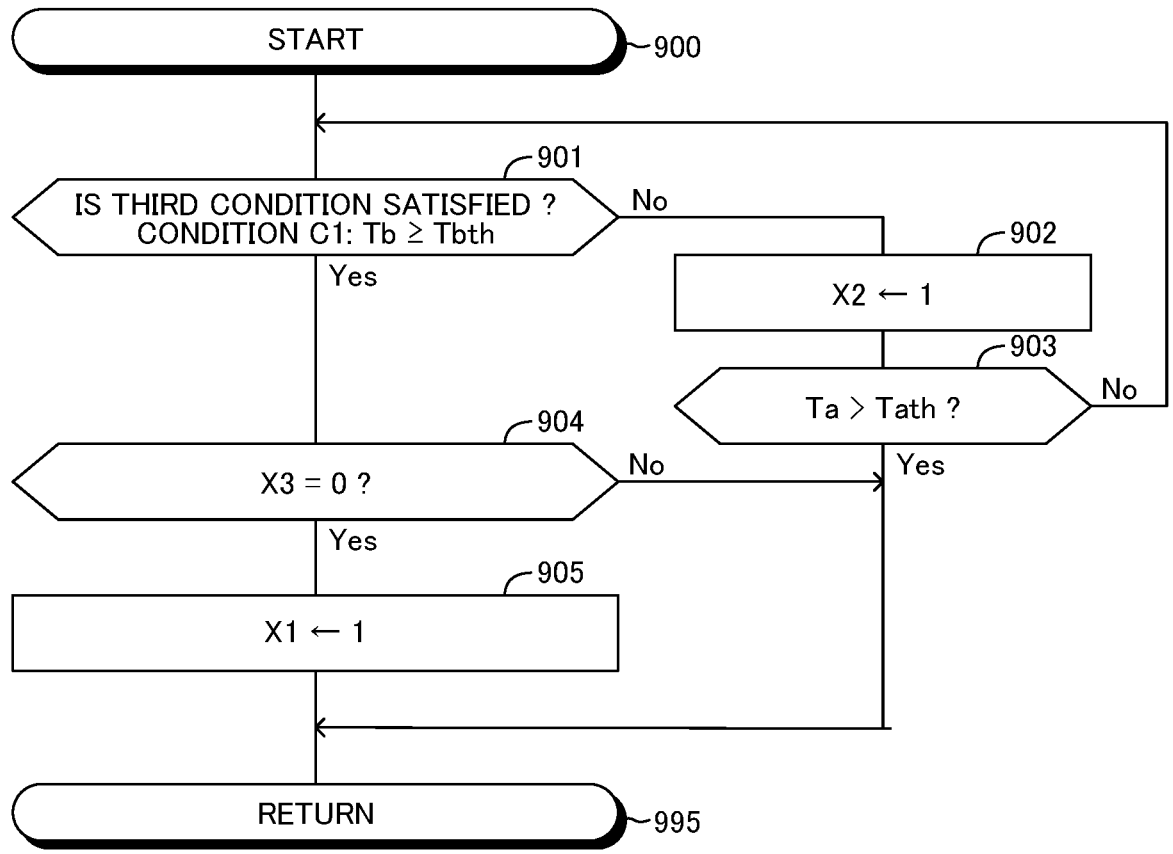
FIG. 9 is a view which shows a flowchart of a second mistaken operation determining routine executed at a step 807 of the routine shown in FIG. 8 by the control ECU.
Figure 13:
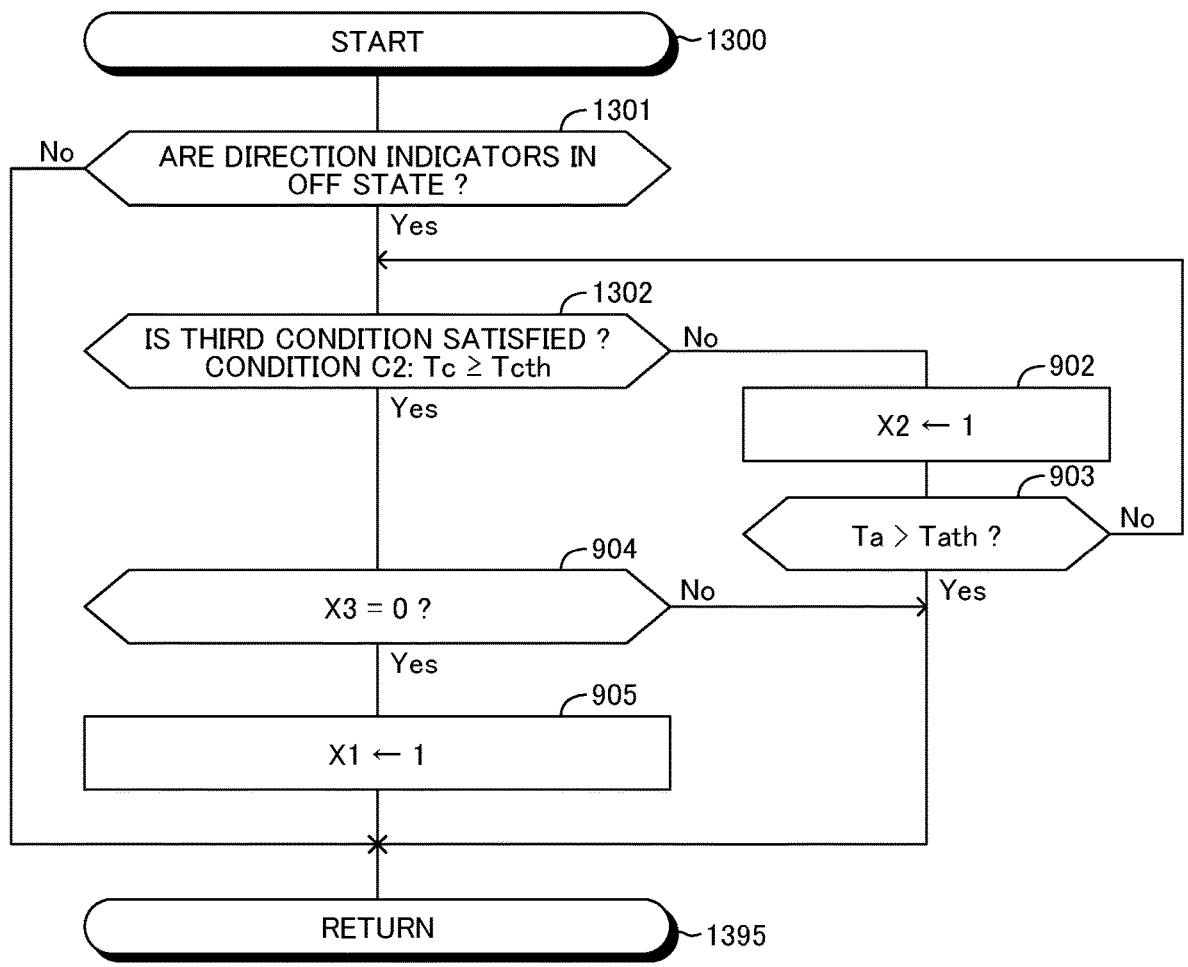
FIG. 13 is a view which shows a flowchart of the second mistaken operation determining routine executed at the step 807 of the routine shown in FIG. 8 by the control ECU of the vehicle control apparatus (a second apparatus) according to a second embodiment of the invention.

The CPU of the control ECU 10 of the second apparatus is configured or programmed to execute a routine shown in FIG. 13 instead of the routine shown in FIG. 9. In the routine shown in FIG. 13, a step 1301 is added to the routine shown in FIG. 9, and the step 901 of the routine shown in FIG. 9 is replaced with a step 1302. It should be noted that in the routine shown in FIG. 13, steps of executing the same processes as those of the routine shown in FIG. 9 are indicated with the same reference symbols as those of the routine shown in FIG. 9. Below, descriptions of the steps of executing the same processes of the routine shown in FIG. 13 as those of the routine shown in FIG. 9, will be omitted.

When the CPU proceeds with the process to the step 807 of the routine shown in FIG. 8, the CPU starts a process from a step 1300 and proceeds with the process to a step 1301. At the step 1301, the CPU determines whether the right and left direction indicators 61r and 61l are in the OFF state. When the right or left direction indicators 61r or 61l are in the ON state, the CPU determines "No" at the step 1301 and proceeds with the process directly to a step 1395 to terminate executing this routine. Then, the CPU proceeds with the process to the step 808 of the routine shown in FIG. 8.

On the other hand, when the right or left direction indicators 61r or 61l are in the OFF state, the CPU determines "Yes" at the step 1301 and proceeds with the process to a step 1302 to determine whether the third condition is satisfied. When the third condition is satisfied, the CPU determines "Yes" at the step 1302 and sequentially executes the process of the steps 904 and 905 as described above. Then, the CPU proceeds with the process to the step 1395. Then, the CPU proceeds with the process to the step 808 of the routine shown in FIG. 8.

It should be noted that when the third condition is not satisfied, the CPU determines "No" at the step 1302 and sequentially executes the processes of the steps 902 and 903 as described above.

When (i) the CPU sets the value of the third flag X3 to "1" by the routine shown in FIG. 10 while the CPU repeatedly executes the processes of the steps 1303, 902 and 903, and (ii) the third condition becomes satisfied after the CPU sets the value of the third flag X3 to "1", the CPU determines "Yes" at the step 1302 and proceeds with the process to the step 904. Then, the CPU determines "No" at the step 904 and proceeds with the process directly to the step 1395 to terminate executing this routine. Then, the CPU proceeds with the process to the step 808 of the routine shown in FIG. 8. In this case, the value of the first flag X1 is "0". Thus, the CPU executes the normal driving force control (see FIG. 11).

As described above, when (i) the third condition (i.e., the condition C2) is not satisfied at a point in time when the second condition becomes satisfied, (ii) the third condition becomes satisfied within the first time threshold Tath since a point in time when the first condition becomes satisfied, and (iii) the pressing condition is satisfied before the third condition becomes satisfied, the second apparatus determines that the predetermined mistaken operation condition is not satisfied. Thus, the driving force limiting control is unlikely to be executed in a situation that the driver intentionally and strongly operates the accelerator pedal 51, for example, a situation that the vehicle VA is accelerated to overtake the preceding vehicle.

It should be noted that the third condition in the step 1302 may include the conditions C1 and C2.

Third Embodiment

Next, the vehicle control apparatus according to a third embodiment of the invention will be described. Hereinafter, the vehicle control apparatus according to the third embodiment will be also referred to as "third apparatus". A configuration of the third apparatus is different from that of the second apparatus in that the third apparatus uses a fourth condition and a fifth condition described later. Below, mainly, the configuration of the third apparatus different from that of the second apparatus will be described.

<Fourth Condition>

The inventors of this application have got knowledge from the past data that the mistaken operation to the accelerator pedal 51 is likely to be carried out when the vehicle VA moves at a low speed. Thus, the predetermined mistaken operation condition may include the fourth condition described below.

Fourth condition: The vehicle moving speed Vs is lower than or equal to a predetermined threshold (in this embodiment, a vehicle moving speed threshold Vth). The vehicle moving speed threshold Vth is, for example, set to a value smaller than or equal to 30 [km/s]. In this embodiment, the vehicle moving speed threshold Vth is set to a value of 30 [km/s].

<Fifth Condition>

The driver is likely to intentionally and strongly operates the accelerator pedal 51 to prevent the vehicle VA from moving rearward when the driver starts the vehicle in a situation that the vehicle VA moves on a slope. On the other hand, when the driver strongly operates the accelerator pedal 51 in a situation that the vehicle VA does not move on the slop, the mistaken operation to the accelerator pedal 51 may be carried out. Thus, the predetermined mistaken operation condition may include the fifth condition described below.

Fifth condition: The gradient Gr is smaller than or equal to a predetermined positive threshold (in this embodiment, a gradient threshold Grth).

<Operations>

Figure 14:
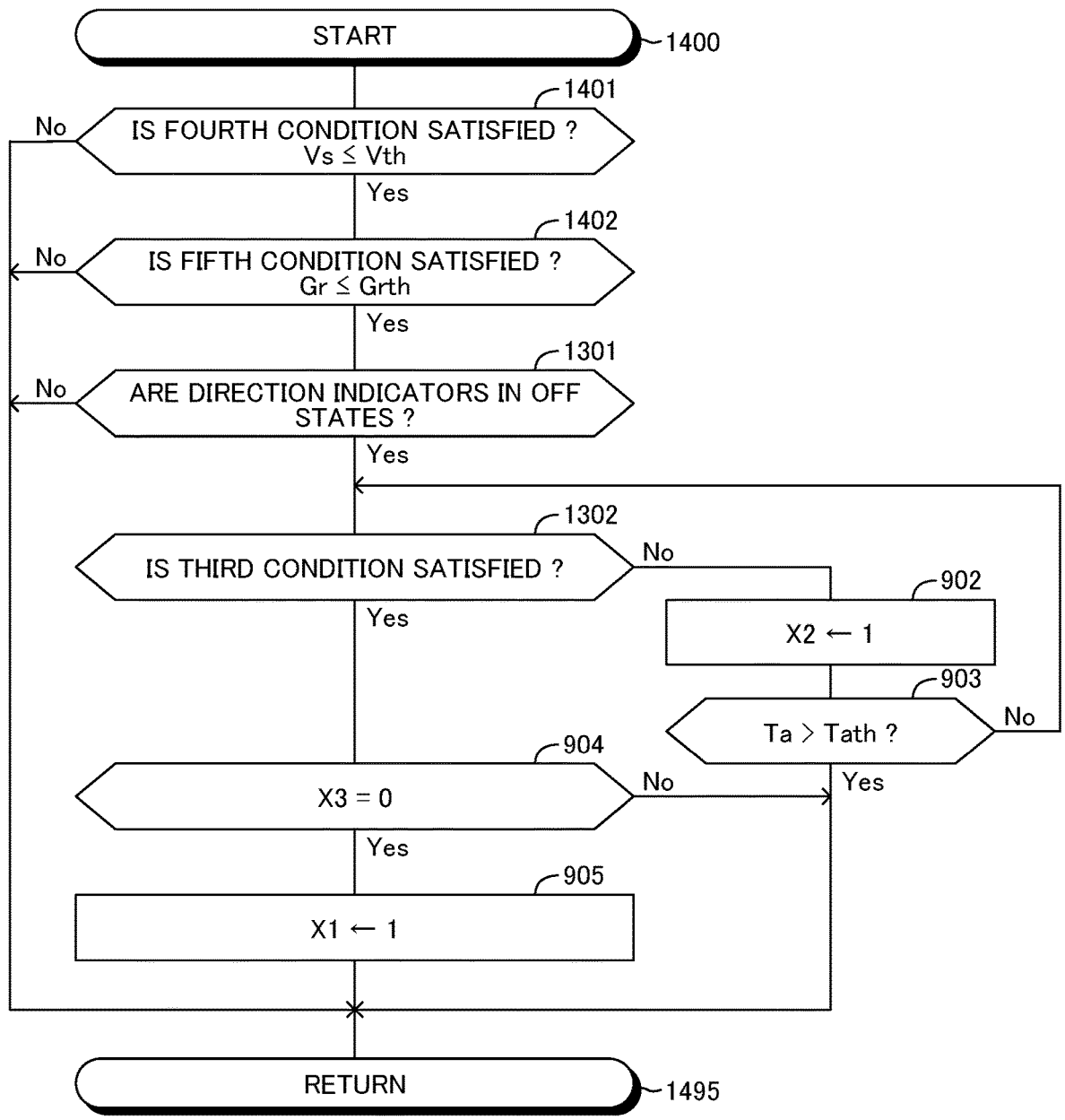
FIG. 14 is a view which shows a flowchart of the second mistaken operation determining routine executed at the step 807 of the routine shown in FIG. 8 by the control ECU of the vehicle control apparatus (a third apparatus) according to a third embodiment of the invention.

The CPU of the control ECU 10 of the third apparatus is configured or programmed to execute a routine shown in FIG. 14 instead of the routine shown in FIG. 13. In the routine shown in FIG. 14, steps 1401 and 1402 are added to the routine shown in FIG. 13. It should be noted that in the routine shown in FIG. 14, steps of executing the same processes as those of the routine shown in FIG. 13 are indicated with the same reference symbols as those of the routine shown in FIG. 13. Below, descriptions of the steps of executing the same processes of the routine shown in FIG. 14 as those of the routine shown in FIG. 13, will be omitted.

When the CPU proceeds with the process to the step 807 of the routine shown in FIG. 8, the CPU starts a process from a step 1400 of the routine shown in FIG. 14 and proceeds with the process to a step 1401. The CPU determine whether the fourth condition is satisfied.

When the fourth condition is not satisfied, the CPU determines "No" at the step 1401 and proceeds with the process directly to a step 1495 to terminate executing this routine once. On the other hand, when the fourth condition is satisfied, the CPU determines "Yes" at the step 1401 and proceeds with the process to a step 1402 to determine whether the fifth condition is satisfied.

When the fifth condition is not satisfied, the CPU determines "No" at the step 1402 and proceeds with the process directly to the step 1495 to terminate executing this routine once. On the other hand, when the fifth condition is satisfied, the CPU determines "Yes" at the step 1402 and proceeds with the process to the step 1301. The processes of the step 1301 and the steps following it are the same as the processes executed by the second apparatus.

As described above, the predetermined mistaken operation condition used by the third apparatus includes the fourth and fifth conditions in addition to the first to third conditions. Thus, the third apparatus can distinguish the mistaken operation to the accelerator pedal 51 from the intentional operation to the accelerator pedal 51 in consideration of the vehicle moving speed Vs and the gradient Gr.

It should be noted that the third condition (the step 1302) of the routine shown in FIG. 14 may include the conditions C1 and C2. In one or more embodiments described above, the third condition may include at least one of the conditions C1 and C2.

It should be noted that the invention is not limited to the aforementioned embodiments, and various modifications can be employed within the scope of the invention.

Modified Example 1

The first condition may include an operation amount condition which relates to the accelerator pedal operation amount AP in addition to the condition A1 (i.e., the operation speed condition).

As shown in FIG. 4, in a situation that the mistaken operation to the accelerator pedal is carried out, the accelerator pedal operation speed APV is still great after a point in time t0 when the accelerator pedal operation speed APV has increased. In particular, the accelerator pedal operation speed APV is still great even when the accelerator pedal operation speed APV is in a relatively high region APm of the middle opening degree region.

On the other hand, in a situation that the intentional operation to the accelerator pedal is carried out, the accelerator pedal operation speed APV slightly decreases after the point in time t0. In particular, the accelerator pedal operation speed APV tends to decrease after the accelerator pedal operation speed APV rapidly increases and then reaches the region APm. Thus, in a situation that the accelerator pedal is intentionally operated, the condition A1 is unlikely to become satisfied when the accelerator pedal operation speed APV is in the region APm.

Thus, the condition A1 of the first condition may be determined when the accelerator pedal operation speed APV is in the region APm in order to distinguish the mistaken operation to the accelerator pedal from the intentional operation to the acceleration with high accuracy. In particular, the CPU determines that the first condition becomes satisfied when a condition A1 and a condition A2 described below both become satisfied.

Condition A1: The accelerator pedal operation speed APV is greater than or equal to the first operation speed threshold APVth1.

Condition A2: The accelerator pedal operation amount AP is greater than or equal to a predetermined positive threshold (in this embodiment, a third operation amount threshold APth3). The third operation amount threshold APth3 is set to a value smaller than the first operation amount threshold APth1 and greater than the terminating threshold APeth. For example, the third operation amount threshold APth3 is set to a value greater than or equal to 50 [%] and smaller than 80 [%]. Preferably, the third operation amount threshold APth3 is set to a value greater than or equal to 70 [%] and smaller than 80 [%]. In this embodiment, the third operation amount threshold APth3 is set to a value of 70 [%]. It should be noted that the condition A2 may be a condition which becomes satisfied when the accelerator pedal operation amount AP is greater than or equal to the third operation amount threshold APth3 and is smaller than the first operation amount threshold APth1.

With this configuration, the CPU determines whether the condition A1 which relates to the accelerator pedal operation speed APV is satisfied in a relatively high region of the middle opening degree region, i.e., a region that the accelerator pedal operation amount AP is greater than or equal to the third operation amount threshold APth3 and is smaller than the first operation amount threshold APth1. In other words, the CPU determines whether the accelerator pedal operation amount AP at a point in time when the condition A1 becomes satisfied, is greater than or equal to the third operation amount threshold APth3. Thus, the mistaken operation to the accelerator pedal 51 can be distinguished from the intentional operation to the accelerator pedal 51 with high accuracy.

Modified Example 2

A timing of determining whether the fourth and fifth conditions are satisfied in the third embodiment is not limited to a timing in the routine shown in FIG. 14, i.e., a timing between the step 1400 and the step 1301. For example, in the routine shown in FIG. 14, the steps 1401 and 1402 may be between the step 1302 and the step 904.

Modified Example 3

The predetermined mistaken operation condition includes the first, second, and third conditions. It should be noted that in the third embodiment, the predetermined mistaken operation condition may not include the fourth and fifth conditions. The predetermined mistaken operation condition may include one of the fourth and fifth conditions in addition to the first to third conditions. Thus, one of the steps 1401 and 1402 may be omitted.

Modified Example 4

The terminating condition (see the step 1202 of the routine shown in FIG. 12) is not limited to one described above. The terminating condition may be a condition which becomes satisfied when the control ECU 10 receives the ON signal from the brake switch 32 or the brake pedal operation amount BP becomes greater than zero.

Modified Example 5

The accelerator pedal operation amount AP is not limited to one described above (i.e., the accelerator pedal opening degree). The accelerator pedal operation amount AP may be information on an accelerator pedal signal. The accelerator pedal signal is output as a voltage which changes or increases, depending on the operation amount of the accelerator pedal 51.

Modified Example 6

The acceleration operator is not limited to the accelerator pedal 51. For example, the acceleration operation may be an accelerator lever. The deceleration operator is not limited to the brake pedal 52. For example, the deceleration operator may be a brake lever.

Modified Example 7

The control ECU 10 may be configured to send the target acceleration Gtgt to the brake ECU 30 at the step 1103 of the routine shown in FIG. 11. In this case, the brake ECU 30 may be configured to control the brake actuators 33 to apply the driving force to the wheels when the actual acceleration Ga exceeds the target acceleration Gtgt. Thereby, the moving state of the vehicle VA is controlled, preventing the actual acceleration Ga from exceeding the upper limit acceleration G1.

Modified Example 8

The gradient sensor 12 which calculates the gradient from the acceleration may be replaced with other sensors. For example, instead of the gradient sensor 12, an inclined angle sensor which detects an inclined angle of the road may be used. In this case, the fifth condition may be a condition which becomes satisfied when the inclined angle θ of the road is smaller than or equal to a predetermined positive threshold (in this embodiment, an incline angle threshold 0th).

Modified Example 9

The driving force limiting control is not limited to one described above. When the control ECU 10 determines that the predetermined mistaken operation condition becomes satisfied, the control ECU 10 may control the driving force to keep the driving force applied to the vehicle VA which changes, depending on the accelerator pedal operation amount AP, smaller, compared with when the predetermined mistaken operation condition is not satisfied, i.e., when the control ECU 10 executes the normal driving force control.

For example, the control ECU 10 may always set the target acceleration Gtgt to zero when the control ECU 10 determines that the predetermined mistaken operation condition becomes satisfied.

According to another example, the control ECU 10 may calculate the target acceleration Gtgt by multiply the requested acceleration Gap which corresponds to the accelerator pedal operation amount AP, by a predetermined coefficient (for example, a value smaller than 1) when the control ECU 10 determines that the predetermined mistaken operation condition becomes satisfied. With this configuration, when the predetermined mistaken operation condition is satisfied, the driving force applied to the vehicle VA is kept smaller, compared with when the predetermined mistaken operation condition is not satisfied, i.e., when the normal driving force control is executed.

What is claimed is:

1. A vehicle control apparatus, comprising:
an acceleration operator which is operated by a driver of a vehicle to accelerate the vehicle;
a deceleration operator which is operated by the driver to decelerate the vehicle;
at least one direction indicator; and
a control unit which executes a driving force limiting control of controlling a driving force applied to the vehicle which changes, depending on an operation amount of the acceleration operator, to the smaller driving force when a predetermined mistaken operation condition is satisfied, compared with when the predetermined mistaken operation condition is not satisfied,
wherein
the predetermined mistaken operation condition includes a first condition, a second condition, and a third condition,
the first condition includes an operation speed condition that an operation speed which corresponds to a change amount of the operation amount per unit time, is greater than or equal to a predetermined positive first operation speed threshold,
the second condition is a condition which is determined after the first condition becomes satisfied and that the operation amount becomes greater than or equal to a predetermined positive first operation amount threshold within a predetermined first time threshold since the first condition becomes satisfied,
the third condition includes at least one of (i) a condition that an elapsed time which elapses since the driver stops operating the deceleration operator, is longer than or equal to a predetermined second time threshold, and (ii) a condition that an elapsed time which elapses since the at least one direction indicator is changed from an ON state to an OFF state, is longer than or equal to a predetermined third time threshold,
the control unit is configured to:
 determine that the predetermined mistaken operation condition is satisfied when the third condition is satisfied at a point in time when the second condition becomes satisfied;
 determine that the predetermined mistaken operation condition is not satisfied when (i) the third condition is not satisfied at a point in time when the second condition becomes satisfied, (ii) the third condition becomes satisfied within the predetermined first time threshold since the first condition becomes satisfied, and (iii) a predetermined pressing condition is satisfied before the third condition becomes satisfied; and
 determine that the predetermined pressing condition is satisfied when (i) the operation amount is greater than or equal to a predetermined positive second operation amount threshold, and (ii) the operation speed is greater than or equal to a predetermined positive second operation speed threshold.

2. The vehicle control apparatus as set forth in claim 1, wherein:
the predetermined positive second operation amount threshold is set to a value greater than or equal to the predetermined positive first operation amount threshold; and
the predetermined positive second operation speed threshold is set to a value smaller than or equal to the predetermined positive first operation speed threshold.

3. The vehicle control apparatus as set forth in claim 1, wherein the first condition includes an operation amount condition that the operation amount at a point in time when the operation speed condition becomes satisfied, is greater than or equal to a positive third amount threshold smaller than the predetermined positive first operation amount threshold, in addition to the operation speed condition.

4. The vehicle control apparatus as set forth in claim 1, wherein the predetermined mistaken operation condition includes at least one of (i) a fourth condition that a moving speed of the vehicle is greater than or equal to a predetermined speed threshold and (ii) a fifth condition that a gradient of a road on which the vehicle moves, is smaller than or equal to a predetermined gradient threshold.

5. A method for a vehicle comprising (i) an acceleration operator which is operated by a driver of a vehicle to accelerate the vehicle, (ii) a deceleration operator which is operated by the driver to decelerate the vehicle, and (iii) at least one direction indicator,
wherein the method comprises:
 a determining step of determining whether a predetermined mistaken operation condition is satisfied; and
 a controlling step of executing a driving force limiting control of controlling a driving force applied to the vehicle which changes, depending on an operation amount of the acceleration operator, to the smaller driving force when determining that the predetermined mistaken operation condition is satisfied at the determining step, compared with when the predetermined mistaken operation condition is not satisfied,
the predetermined mistaken operation condition includes a first condition, a second condition, and a third condition,
the first condition includes an operation speed condition that an operation speed which corresponds to a change amount of the operation amount per unit time, is greater than or equal to a predetermined positive first operation speed threshold,
the second condition is a condition which is determined after the first condition becomes satisfied and that the operation amount becomes greater than or equal to a predetermined positive first operation amount threshold within a predetermined first time threshold since the first condition becomes satisfied,
the third condition includes at least one of (i) a condition that an elapsed time which elapses since the driver stops operating the deceleration operator, is longer than or equal to a predetermined second time threshold, and (ii) a condition that an elapsed time which elapses since the at least one direction indicator is changed from an ON state to an OFF state, is longer than or equal to a predetermined third time threshold,
the determining step includes:
 a step of determining that the predetermined mistaken operation condition is satisfied when the third condition is satisfied at a point in time when the second condition becomes satisfied;
 a step of determining that the predetermined mistaken operation condition is not satisfied when (i) the third condition is not satisfied at a point in time when the second condition becomes satisfied, (ii) the third condition becomes satisfied within the predetermined first time threshold since the first condition becomes satisfied, and (iii) a predetermined pressing condition is satisfied before the third condition becomes satisfied; and a step of determining that the predetermined pressing condition is satisfied when (i) the operation amount is greater than or equal to a predetermined positive second operation amount threshold, and (ii) the operation speed is greater than or equal to a predetermined positive second operation speed threshold.

* * * * *